United States Patent
Dai et al.

(10) Patent No.: US 10,333,314 B2
(45) Date of Patent: Jun. 25, 2019

(54) MULTIPLE BUCK STAGE SINGLE BOOST STAGE OPTIMIZER

(71) Applicant: Futurewei Technologies, Inc., Plano, TX (US)

(72) Inventors: Heping Dai, Plano, TX (US); Xiaolin Mao, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/489,278

(22) Filed: Apr. 17, 2017

(65) Prior Publication Data

US 2018/0301905 A1 Oct. 18, 2018

(51) Int. Cl.
*H02M 3/158* (2006.01)
*H02J 3/38* (2006.01)
*H02M 1/00* (2006.01)

(52) U.S. Cl.
CPC ............ *H02J 3/383* (2013.01); *H02M 3/1582* (2013.01); *H02M 2001/007* (2013.01); *H02M 2001/0077* (2013.01); *Y02E 10/563* (2013.01)

(58) Field of Classification Search
CPC ......... H02M 2001/0003; H02M 3/156; H02M 3/158; H02M 7/44; H02M 2001/0009; H02M 3/1582; H02M 3/1584; Y02B 70/10; Y02B 70/1466
See application file for complete search history.

(56) References Cited

U.S. PATENT DOCUMENTS

| 8,004,116 B2 | 8/2011 | Ledenev et al. |
| 8,093,757 B2 | 1/2012 | Wolfs |
| 9,088,178 B2 | 7/2015 | Adest et al. |

(Continued)

FOREIGN PATENT DOCUMENTS

| CN | 103312154 A | 9/2013 |
| CN | 104506135 A | 4/2015 |

(Continued)

OTHER PUBLICATIONS

U.S. Appl. No. 15/650,370, filed Jul. 14, 2017 by Dai et al., entitled "Distributed/Central Optimizer Architecture,".

(Continued)

*Primary Examiner* — Timothy J. Dole
*Assistant Examiner* — Shahzeb K Ahmad
(74) *Attorney, Agent, or Firm* — Vierra Magen Marcus LLP

(57) ABSTRACT

The disclosure relates to technology for providing power, voltage, and/or current from a combination of DC power sources, such as photovoltaic modules or DC batteries. One aspect includes a buck-boost optimizer having a number of inductorless buck stages and a boost stage. The buck-boost optimizer may be used within a power generation system. The combined output voltages of each of the buck stages may be input to the boost stage. The boost stage may have an inductor that may serve as an energy storage device to boost a voltage, as well as to filter a signal from the buck stages. Thus, the buck-boost optimizer may use a single inductor. Having a single inductor provides for a very efficient power generation system. Also, cost and size of components in the power generation system may be reduced.

23 Claims, 18 Drawing Sheets

(56) References Cited

U.S. PATENT DOCUMENTS

| | | |
|---|---|---|
| 9,806,523 B2 * | 10/2017 | Stratakos ................ H02J 3/383 |
| 10,135,332 B2 * | 11/2018 | Tanifuji ................ H02M 3/158 |
| 2006/0185727 A1 | 8/2006 | Matan et al. |
| 2014/0327313 A1 | 11/2014 | Arditi et al. |
| 2016/0006250 A1 | 1/2016 | Ramond et al. |
| 2016/0164298 A1 * | 6/2016 | Baba ........................ G05F 1/67 307/24 |
| 2017/0271878 A1 | 9/2017 | Feng et al. |

FOREIGN PATENT DOCUMENTS

| | | |
|---|---|---|
| CN | 105978386 | 9/2016 |
| DE | 102012217554 A1 | 3/2014 |

OTHER PUBLICATIONS

PCT/CN2018/083396, ISR, Jun. 27, 2018 10 pages.
Non-final Office Action dated Apr. 17, 2019, U.S. Appl. No. 15/650,370, filed Jul. 14, 2017.

* cited by examiner

MULTIPLE BUCK STAGE SINGLE BOOST STAGE OPTIMIZER

BACKGROUND

Photovoltaic panels generate Direct Current (DC) voltages. Typically, the DC voltage and DC current from one photovoltaic panel is well below the needs of the voltage and current needed for the Alternating Current (AC) power grid. Typically, many photovoltaic panels are used in combination within a photovoltaic power generation system to provide the necessary voltage and current for the AC power grid. The DC voltages/currents also need to be converted to AC voltages/currents.

One significant challenge is to operate the photovoltaic panels for maximum power efficiency. For at least some photovoltaic panels, there is an output voltage at which the photovoltaic panel will produce a maximum power output. The maximum power can vary with factors such as solar radiation and temperature of the photovoltaic panel. Moreover, the conditions at the various photovoltaic panels can differ from each other. Thus, for the photovoltaic power generation system to operate at or near optimum power efficiency, the various photovoltaic panels might need to be operated at different output voltages.

There are also challenges with operating other power generation systems, such as those that provide power from a collection of DC batteries.

BRIEF SUMMARY

In a first embodiment, a system comprises a plurality of inductorless buck stages each having an input configured to receive a DC voltage from a DC power source and a buck stage output configured to provide a DC voltage. The system further comprises logic configured to operate the plurality of buck stages to regulate a power output of each of the DC power sources. The system further comprises a boost stage comprising a boost stage output and a boost stage input configured to receive the combined DC voltages from the plurality of buck stage outputs.

In a second embodiment, in accordance with the first embodiment, the boost stage further comprises a filter that is configured to receive a current output of the plurality of buck stages.

In a third embodiment, in accordance with the second embodiment, the boost stage is configured to use the filter as an energy storage device.

In a fourth embodiment, in accordance with the second and third embodiments, the filter is an inductor.

In a fifth embodiment, in accordance with the first through fourth embodiments, the logic is further configured to: receive a signal from an output of each of the DC power sources; and control a duty cycle of each of the buck stages based on the signal.

In a sixth embodiment, in accordance with the first through fifth embodiments, the DC voltage sources are photovoltaic modules. The logic is further configured to control a duty cycle of the plurality of buck stages to operate the photovoltaic modules at maximum power points.

In a seventh embodiment, in accordance with the first through sixth embodiments, the system further comprises a DC to AC converter having an input connected to the boost stage output, wherein the DC to AC converter is configured to regulate a DC voltage at the input of the DC to AC converter.

In an eighth embodiment, in accordance with the first through seventh embodiments, the logic is further configured to control a duty cycle of the boost stage to reduce the voltage at the input of the boost stage relative to the voltage at the output of the boost stage responsive to a determination that the DC voltage at the input of the DC to AC converter does not meet a criterion.

In a ninth embodiment, in accordance with the first through eighth embodiments, the logic is further configured to instruct the boost stage to reduce the voltage at the input of the boost stage below a threshold voltage responsive to a determination that the combined output voltage of the plurality of buck stages will need to fall below the threshold voltage in order to maintain a target duty cycles of the buck stages.

In a tenth embodiment, in accordance with the first through ninth embodiments, the plurality of buck stages are configured to generate a pulse width modulated output voltage at the same switching frequency, wherein the plurality of buck stages are configured to interleave the pulse width modulated output voltages.

An eleventh embodiment includes a method of operating a power generation system. The method comprises: receiving DC voltages from each of respective ones of a plurality of photovoltaic modules at a corresponding plurality of inductorless buck stages; operating each of the plurality of inductorless buck stages to regulate a power output of the corresponding photovoltaic modules, including generating an output voltage for each buck stage; receiving a combined output voltage from all of the plurality of buck stages at an input of a boost stage; operating the boost stage to boost the combined output voltage from the buck stages; and providing the boosted voltage to a solar inverter.

In a twelfth embodiment, in accordance with eleventh embodiment, the method further comprise receiving an output current of the plurality of inductorless buck stages at a filter of the boost stage.

In a thirteenth embodiment, in accordance with eleventh through twelfth embodiments, the filter comprises an inductor. The method further comprises operating the boost stage to boost the output voltage from the buck stages comprises storing energy in the inductor.

In a fourteenth embodiment, in accordance with eleventh through thirteenth embodiments, the method further comprises: reducing the voltage at the input of the boost stage responsive to a condition of the plurality of buck stages; and boosting the reduced voltage by the boost stage to maintain the output voltage of the boost stage at a target voltage level.

In a fifteenth embodiment, in accordance with eleventh through fourteenth embodiments, operating each of the plurality of inductorless buck stages to regulate a power output of the corresponding photovoltaic modules comprises: generating a pulse width modulated output voltage at each of the buck stages at the same switching frequency; and interleaving the pulse width modulated output voltages.

A sixteenth embodiment includes a photovoltaic power system, comprising a plurality of photovoltaic modules, each configured to provide a DC voltage; and a buck-boost convertor. The buck-boost convertor comprises a plurality of inductorless buck stages and a boost stage. Each of the inductorless buck stages comprises an input configured to receive the DC voltage from one of the photovoltaic modules. Each of the inductorless buck stages comprises an output configured to provide a DC voltage. Each of the buck stages is configured to regulate a power output of the corresponding photovoltaic module. The boost stage comprises an input configured to receive the combined DC voltages from the plurality of buck stage outputs. The boost stage comprises an output configured to provide a DC voltage.

In a seventeenth embodiment, in accordance with the sixteenth embodiment, the plurality of buck stages are configured to provide a series output current. The boost stage comprises an inductor that is configured to receive the series current.

In an eighteenth embodiment, in accordance with the sixteenth through seventeenth embodiments, the boost stage is configured to use the inductor as an energy storage device to boost the combined DC voltages from the plurality of buck stages and to provide the boosted voltage at the output of the boost stage.

In a nineteenth embodiment, in accordance with the sixteenth through eighteenth embodiments, the photovoltaic power system comprises a plurality of buck-boost convertors as recited in the sixteenth embodiment. The plurality of buck-boost convertors are connected in series. The combined DC voltage output from the boost stages of the plurality of buck-boost convertors is provided to a solar inverter.

In a twentieth embodiment, in accordance with the sixteenth through eighteenth embodiments, the photovoltaic power system further comprises a plurality of buck-boost convertors as recited in the sixteenth embodiment. The plurality of buck-boost convertors are connected in series. The photovoltaic power system further comprises an additional boost stage having an input configured to receive the combined DC voltages from the boost stages of the plurality of buck-boost convertors. The photovoltaic power system further comprises a solar inverter having a DC input configured to receive a DC voltage from an output of the additional boost stage.

In a twenty-first embodiment, in accordance with the sixteenth through twentieth embodiments, the plurality of buck stages are configured to generate a pulse width modulated output voltage at the same switching frequency. The plurality of buck stages are configured to interleave the pulse width modulated output voltages.

In a twenty-second embodiment, in accordance with the sixteenth through twenty-first embodiments, a first of the photovoltaic modules comprises a single photovoltaic panel, multiple photovoltaic panels that are connected in series, or a sub-string of a photovoltaic panel.

In a twenty-third embodiment, in accordance with the sixteenth through twenty-second embodiments, the photovoltaic power system comprises a plurality of buck-boost convertors as recited in the sixteenth embodiment. The plurality of buck-boost convertors are connected in series, connected in parallel, or a combination of series and parallel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

The disclosure relates to technology for providing power, voltage, and/or current from a combination of DC sources. The DC sources may be power sources. In one embodiment, the DC sources are photovoltaic (e.g., solar) modules. In one embodiment, the DC sources are DC batteries. The technology may be used within a power generation system.

One embodiment includes a buck-boost optimizer having a number of inductorless buck stages and a boost stage. The buck-boost optimizer may be used within a power generation system. The combined output voltages of each of the buck stages may be input to the boost stage. The boost stage may have an inductor that may serve as an energy storage device to boost a voltage, as well as to filter a signal from the buck stages. Thus, the buck-boost optimizer may use a single inductor. Having a single inductor provides for a very efficient power generation system. Also, cost and size of components in the power generation system may be reduced.

Figure 1:
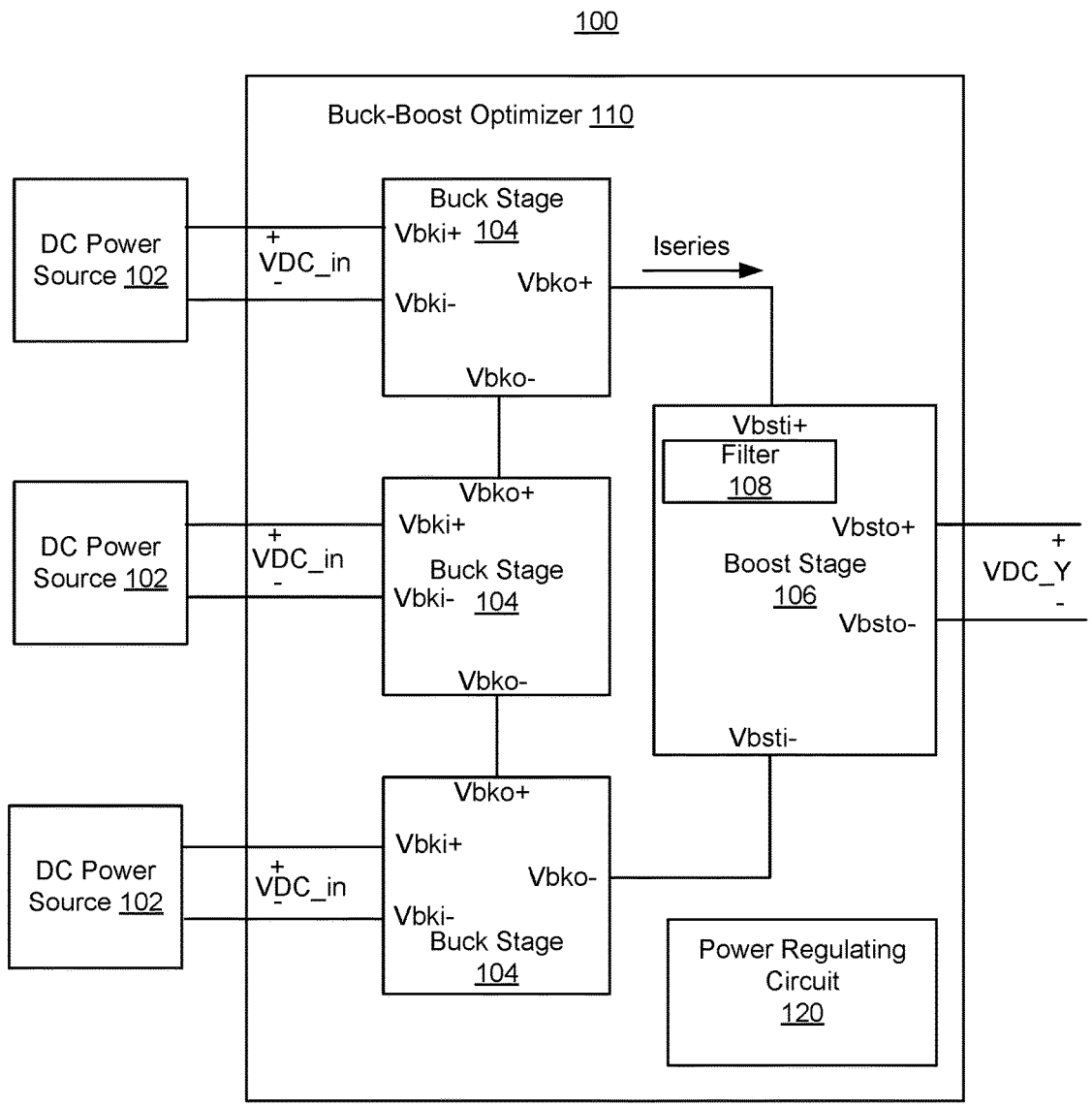
FIG. 1 is a diagram of one embodiment of a power generation system having a buck-boost optimizer connected to DC power sources.

FIG. 1 is a diagram of one embodiment of a power generation system 100 having a buck-boost optimizer 110 connected to DC power sources 102. The buck-boost optimizer 110 has a number of buck stages 104 and a boost stage 106. Herein, the buck-boost optimizer 110 may also be referred to as a buck-boost convertor. The buck-boost convertor 110 may also be referred to as a DC to DC convertor. The buck-boost convertor 110 may convert a DC input voltage to a DC output voltage. The buck-boost convertor 110 may convert a DC input current to a DC output current.

Each buck stage 104 is associated with one of the DC power sources 102. The DC power sources 102 may be photovoltaic (e.g., solar) modules, DC batteries, etc. Although three buck stages 104 are depicted, there may be more or fewer than three buck stages 104. Each buck stage 104 has an input that is connected to an output of a DC power source 102. The input of each buck stage is labeled with a Vbki+ terminal and a Vbki− terminal. Each buck stage 104 has an output that is labeled by the Vbko+ and Vbko− terminals. Each buck stage 104 may output a DC voltage across the Vout terminals. A buck stage 104 may be controlled such that the DC voltage at its output terminals (Vbko+, Vbko−) is less than the DC voltage at its input terminals (Vbki+, Vbki−).

In some embodiments, each buck stage 104 is inductorless. That is, the buck stage 104 does not have an inductor, in some embodiments. An inductorless buck stage 104 may be more efficient at transferring power from its DC power source than a buck stage 104 having an inductor. An inductorless buck stage 104 may also save cost relative to having an inductor in each buck stage 104. An inductorless buck stage 104 may also save weight and/or size relative to having an inductor in each buck stage 104.

Note that although the same name (Vbki+) has been used for the positive input terminals of each of the buck stages 104, it will be understood that the positive input terminals are not shorted together. Likewise, although the same name (Vbki−) has been used for the negative input terminals of each of the buck stages 104, it will be understood that the negative input terminals are not shorted together. Likewise, although the same name (Vbko+) has been used for the positive output terminals of each of the buck stages 104, it will be understood that the positive output terminals are not shorted together. Likewise, although the same name (Vbko−) has been used for the negative output terminals of each of the buck stages 104, it will be understood that the negative output terminals are not shorted together.

The buck-boost optimizer 110 also has a power regulating circuit 120. The power regulating circuit 120 may be used to control each of the buck stages 104 in a manner to regulate the power output of the corresponding DC power source 102. For example, if the DC power sources 102 are photovoltaic modules, each buck stage 104 may be used to cause a photovoltaic module to operate at or near a maximum power point. In one embodiment, this may be achieved by regulating the DC voltage (e.g., VDC_in) at the input terminals (Vbki+, Vbki−) of the buck stage 104. Note that having a buck stage 104 associated with each DC power source 102 allows the power output of each DC power source 102 to be controlled independently of the other DC power sources 102. Therefore, the power output of each DC power source can be efficiently regulated.

The boost stage 106 has an input labeled with terminals Vbsti+ and Vbsti−. Those input terminals receive the combined output voltages of the buck stages 104. Thus, the boost stage 106 is connected to the buck stages 104 in a manner to receive the combined output voltages of the buck stages 104. Also, the buck stages 104 are connected in a manner such that a current referred to as "Iseries" is provided from the buck stages 104 to the boost stage 106. This current may be processed by filter 108 in the boost stage 106.

The boost stage 106 also has output terminals Vbsto+, Vbsto−, which provide a voltage referred to as VDC_Y. The boost stage 106 may be configured to boost the voltage at its input terminals (Vbsti+, Vbsti−) to generate a boosted voltage at its output terminals. In one embodiment, filter 108 is used as an energy storage device when boosting the voltage. The filter may be used to store energy from a signal on the boost stage input terminals and transfer that energy to the boost stage output terminals. In one embodiment, the filter 108 is an inductor.

As noted, the buck stages 104 may be inductorless. Thus, the buck-boost optimizer 110 may have a single inductor (e.g., filter 108). Having a single inductor in the buck-boost optimizer 110 provides for efficient power transfer of power from the DC power sources 102 to the output of the boost stage 106.

Moreover, note that the filter 108 (e.g., inductor) may serve a dual purpose in the buck-boost optimizer 110. One purpose may be to filter the current "Iseries" from the buck stages 104. Note that output current of the buck stages 104 may have some ripple. The filter 108 can help to remove some of the ripple. Also, the filter 108 (e.g., inductor) may serve as an element that helps to boost the voltage at the input of the boost stage 106.

Figure 2A:
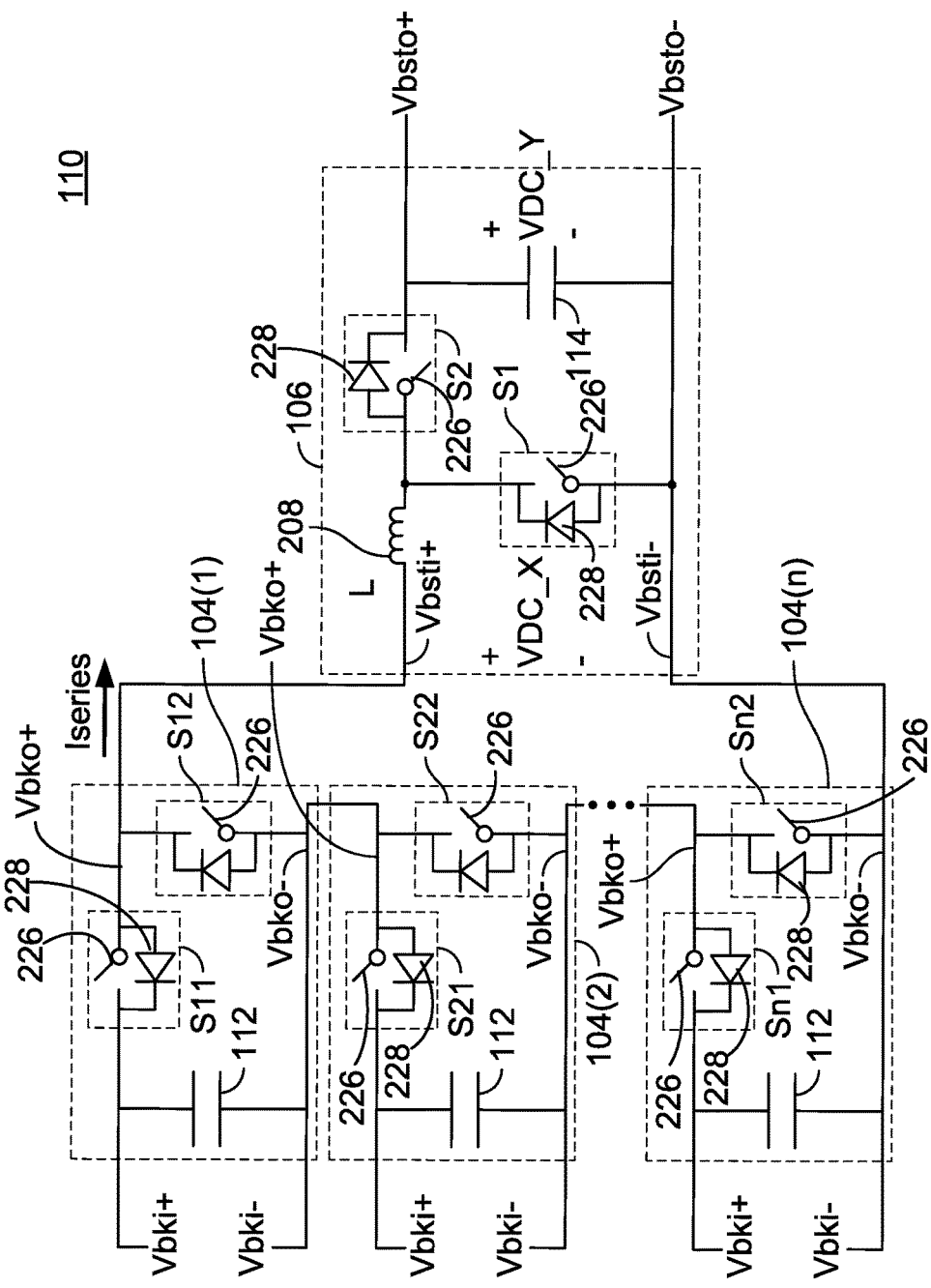
FIG. 2A is a diagram of one embodiment of a buck-boost optimizer.

FIG. 2A is a diagram of one embodiment of a buck-boost optimizer 110. The buck-boost optimizer 110 has a number of buck stages 104(1) to 104(n) and a boost stage 106. The buck-boost optimizer 110 of FIG. 2A may be used in the power generation system 100 of FIG. 1.

Figure 2B:
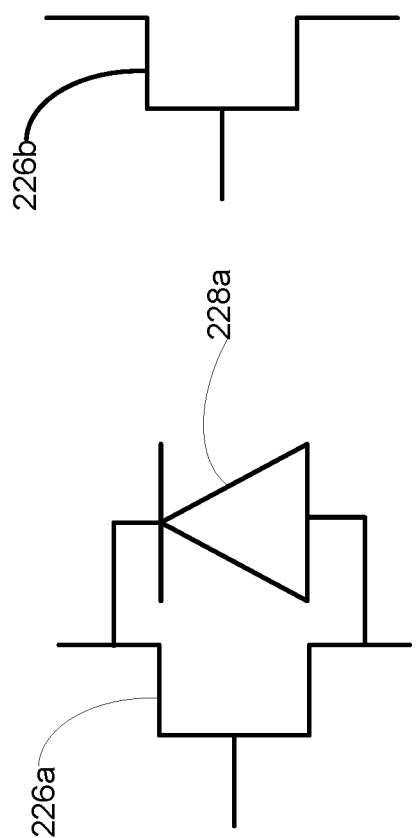
FIGS. 2B-2D depict various embodiments of electrical elements that may be used in the circuit of FIG. 2A.
Figure 2C:
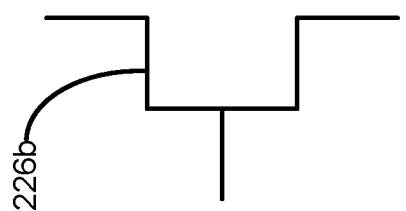
Figure 2D:
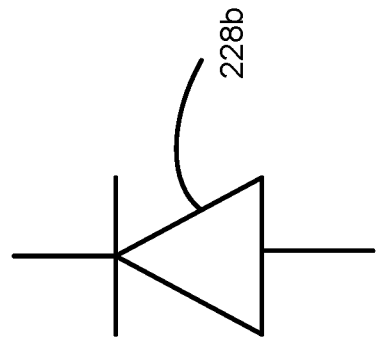

Each of the buck stages 104 has an input capacitor 112 and two switches. Each of the buck stages 104 is inductorless. The input capacitor 112 is connected across the input terminals Vbki+, Vbki−. Note that the input terminals Vbki+, Vbki may be connected across a DC power source, such as a photovoltaic module. However, the DC power source is not depicted in FIG. 2A. The input capacitor 112 may serve as an energy storage device for at least part of the operation of the buck stage 104. Buck stage 104(1) has switches S11 and S12, buck stage 104(2) has switches S21 and S22, and buck stage 104(n) has switches Sn1 and Sn2. Switches S11, S21, . . . Sn1 can be opened and closed, in one embodiment. As depicted, switches S11, S21, . . . Sn1 have a switch element 226 and a diode 228 in parallel with the switch element. The switch element 226 can be implemented with a transistor. The diode 228 in parallel with the switch element 226 is optional. As depicted, switches S12, S22, Sn2 have an switch element 226 and a diode 228 in parallel with the switch element 226. Switches S12, S22, Sn2 can be opened and closed, in one embodiment. However, switches S12, S22, Sn2 can be replaced by circuit elements that do not open and close. For example, one option is to replace switches S12, S22, Sn2 with a rectifier, such as a diode. In this case, the diode 228 may have its anode and cathode connected to the output terminals (Vbko+, Vbko−) as depicted in FIG. 2A. The discussion of FIGS. 2B-2D provides further details of electronic elements that may implement the switches in the buck stages 104.

Consistent with the discussion of FIG. 1, the same name (Vbki+) has been used for the positive input terminals of each of the buck stages 104(1)-104(n). However, it will be understood that the positive input terminals (Vbki+) are not shorted together. Likewise, although the same name (Vbki−) has been used for the negative input terminals of each of the buck stages 104(1)-104(n), it will be understood that the negative input terminals are not shorted together. Likewise, although the same name (Vbko+) has been used for the positive output terminals of each of the buck stages 104(1)-104(n), it will be understood that the positive output terminals are not shorted together. Likewise, although the same name (Vbko−) has been used for the negative output terminals of each of the buck stages 104(1)-104(n), it will be understood that the negative output terminals are not shorted together.

Operation of buck stage 104(1) is as follows, in one embodiment. Operation of the other buck stages 104(2)-104(n) is similar, for the corresponding switches. In one embodiment, operation of a buck stage 104(1) has two phases. The two phases may be demarcated based on whether switch S11 is open or closed. The relative proportion of time spent in each phase may be referred to as the duty cycle. In other words, the proportion of time spent for which switch S11 is closed/open may define the duty cycle. In one embodiment, when switch S11 is open, S12 is closed; when switch S11 is closed, S12 is open. However, note that the switch element 226 of switch S12 may be open throughout operation, with the switch S12 in effect acting as a rectifier. Thus, switch S12 could be replaced by a diode without any switch element (such as a transistor). Note that the term "duty cycle" may thus apply to switch S11 or to the buck stage 104(1) in general. Therefore, the duty cycle of the buck stage 104(1) or the duty cycle of switch S11 may be referred to herein.

Opening switch S11 may result in the DC power source (e.g., photovoltaic module) charging the input capacitor 112. Closing switch S11 may result in current being provided from the input capacitor 112 (and possibly the DC power source) to the output of the buck stage 104(1). The duty cycle may determine how much energy is provided by the input capacitor 112 and DC power source. In one embodiment, the duty cycle of switch S11 is controlled in order to regulate the power output of the DC power source. For example, the duty cycle of switch S11 may be established to operate a photovoltaic module at a maximum power point (or to at least attempt to maximize power output of a photovoltaic module).

The boost stage 106 includes an inductor 208, an output capacitor 114, switch S1 and switch S2. The inductor 208 is one example of filter 108 in FIG. 1. Switches S1 and S2 are depicted as having a switch element 226 with a diode 228 in parallel. The diode 228 is not required. Switches S1 and S2 may comprise a transistor to implement the switch element 226. Switch S1 could have a diode 228 in parallel with switch element 226, but the diode 228 is not required. Switch S2 can be opened and closed, in one embodiment. Thus, switch S2 may have a transistor that can be switched on and off to implement the switch element 226. However, switch S2 can be replaced by a circuit element that acts as a rectifier, such as a diode. Thus, the switch element 226 is not required in switch S2. The discussion of FIGS. 2B-2D provides further details.

Operation of boost stage 106 is as follows, in one embodiment. The boost stage 106 may be operated between a bypass mode and a boost mode. For the bypass mode, switch S2 is closed and S1 is open, in one embodiment. In this bypass mode, the voltage VDC_x is passed to the output capacitor 114. Thus, in the bypass mode, VDC_y is substantially equal to VDC_x. Note that there may be some non-ideal characteristics of the circuit components. For example, there may be some resistance along conductive pathways. Thus, the output voltage is not necessarily exactly equal to the input voltage. Thus, by using the term "substantially equal" in this context, it will be understood that non-ideal characteristics of the circuit components are considered.

The boost stage 106 may be operated in what may be referred to as a boost mode. In the boost mode, the voltage of the input (VDC_X) may be less than the output voltage (VDC_Y). In other words, the voltage of the output (VDC_Y) may be greater than the input voltage (VDC_X). In one embodiment of a boost mode, switches S1, S2 are switched on and off. In one embodiment, the boost mode has a first phase in which switch S1 is closed and switch S2 is open; and a second phase in which switch S1 is open and switch S2 is closed. The duty cycle of the boost stage 106 may be defined by the percentage of the time that switch S1 is closed. Note that the bypass mode may be considered to have a duty cycle of 0 percent (e.g., switch S1 is always open, switch 2 is always closed).

When switch S1 is closed and switch S2 is open, energy may be stored in the inductor 208. When switch S1 is open and switch S2 is closed, the energy that was stored in the inductor 208 may be transferred to the output capacitor 114. In general, a higher duty cycle for the boost stage 106 may result in a lower voltage (VDC_X) at the input terminals (Vbsti+, Vbsti−) of the boost stage 106.

FIG. 2A depicts a number of switches in the buck stages 104 and boost stage 106. FIGS. 2B-2D depict various embodiments of electrical elements that may be used in the circuit of FIG. 2A. As noted in the discussion of FIG. 2A, the switches might or might not have a diode 228 in parallel with switch element 226, such as a transistor. FIG. 2B is an embodiment in which a switch comprises a transistor 226a and a diode 228a in parallel with the transistor 226a. The transistor 226a may serve as switch element 226. The circuit of FIG. 2B may be used for any of the switches in FIG. 2A. The diode 228a may have its anode and cathode arranged as in the diode 228 in the switches in FIG. 2A.

FIG. 2C depicts one embodiment in which each switch comprises a transistor 226b. However, the switch does not include a diode in parallel with transistor 226b. The circuit of FIG. 2C may be used for any of the switches in FIG. 2A.

As noted in the discussion of FIG. 2A, the switches S12, S22, Sn2 can be replaced by, for example, rectifying elements. Also, switch S2 in the boost stage 106 could be replaced by, for example, a rectifying element. FIG. 2D depicts one embodiment of a rectifying element that can be used in place of switches S12, S22, Sn2 in the buck stages 104. Likewise, the rectifying element can be used in place of switch S2 in the boost stage 106. The rectifying element is a diode 228b in this embodiment. The diode 228b may have its anode and cathode arranged as in the diode 228 in switches S12, S22, Sn2. The diode 228b may have its anode and cathode arranged as in the diode 228 in switch S2 in the boost stage 106.

Discussion will now continue with respect to FIGS. 2E, 3, 4, 5, 6, 7, and 8 of embodiments of power generation systems (also referred to as photovoltaic power systems) that contain at least one buck-boost optimizer 110. Those of ordinary skill in the art will appreciate that aspects of the buck-boost optimizer 110 of FIG. 2A may apply to the buck-boost optimizer 110 in FIGS. 2E, 3, 4, 5, 6, 7, and 8. Hence, discussion of circuit elements in common and their operation will not be repeated.

Figure 2E:
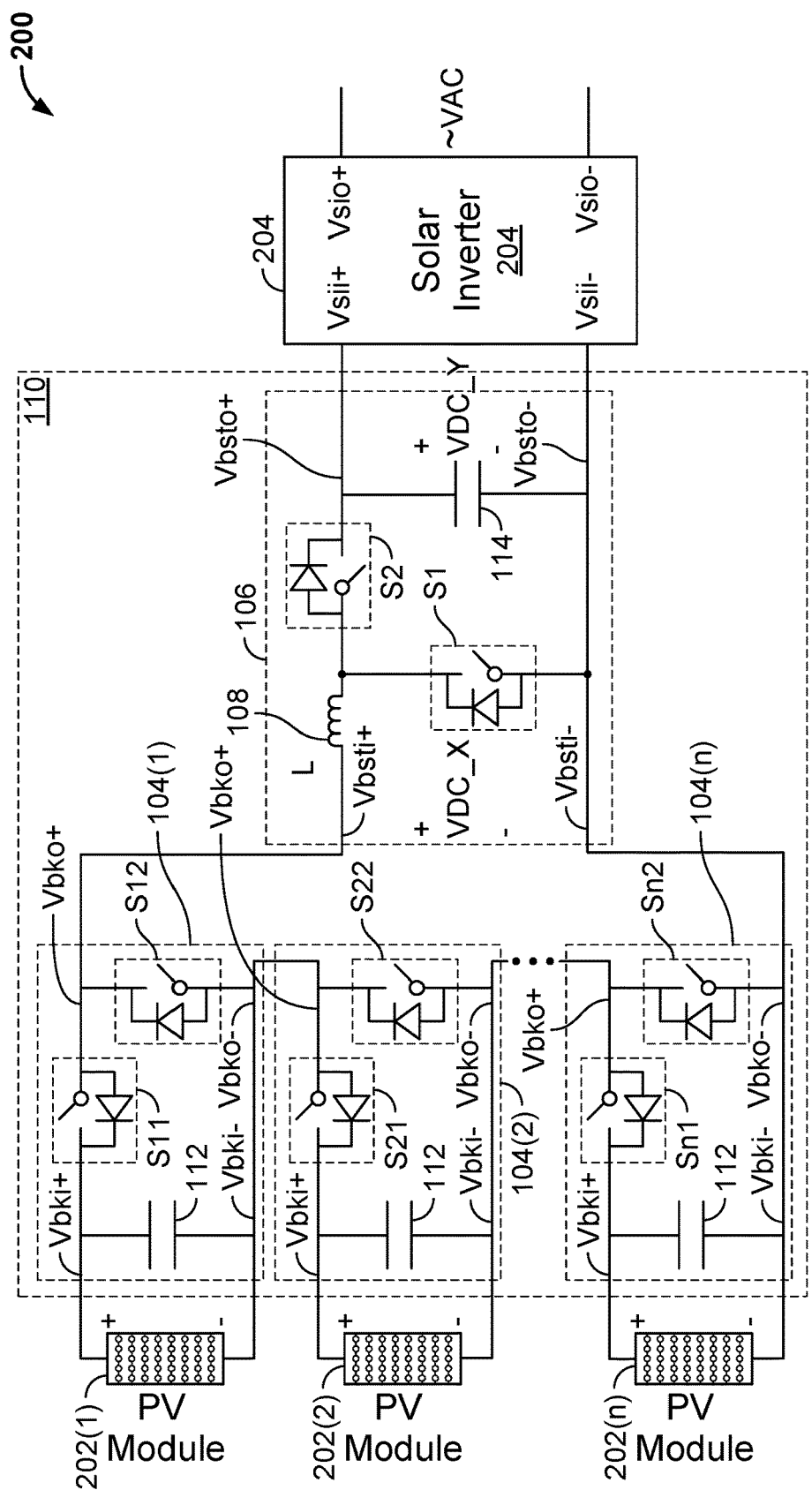
FIG. 2E is a diagram of one embodiment of a power generation system 200 having a buck-boost optimizer.

FIG. 2E is a diagram of one embodiment of a power generation system 200 (note that this and other power generation system described herein with photo-voltaic modules may also be referred to as a photovoltaic power system) having a buck-boost optimizer 110. The system 200 has a number of photo-voltaic modules 202(1)-202(n). Each photo-voltaic modules 202(1)-202(n) is an example of a DC power source. Each photo-voltaic module 202 has its output connected to the input terminals of one of the buck stages 104. Each buck stage 104 may be operated to regulate the power output of its photo-voltaic module. For example, a buck stage 104 may be used to operate a photo-voltaic module 202 at a maximum power point, or to at least attempt to maximize power output of the photo-voltaic module 202.

The photovoltaic power system 200 has a solar inverter 204. The solar inverter may also be referred to as a DC to AC converter. The solar inverter 204 has its input terminals (Vsii+, Vsii−) connected to the output terminals (Vbsto+, Vbsto−) of the boost stage 106. The solar inverter 204 is configured to regulate the voltage at its input terminals, in one embodiment. For example, the solar inverter 204 may be configured to attempt to hold its input voltage at some target voltage. The solar inverter 204 is configured to convert the DC voltage at its input to an AC voltage. The solar inverter 204 outputs the AC voltage (VAC) to its output terminals (Vsio+, Vsio−).

Note that although capacitor 114 is depicted as part of the boost stage 106 in FIG. 2E, in one embodiment, capacitor 114 is within the solar inverter 204. In one embodiment, the entire boost stage 106 is within the solar inverter 204.

Figure 2F:
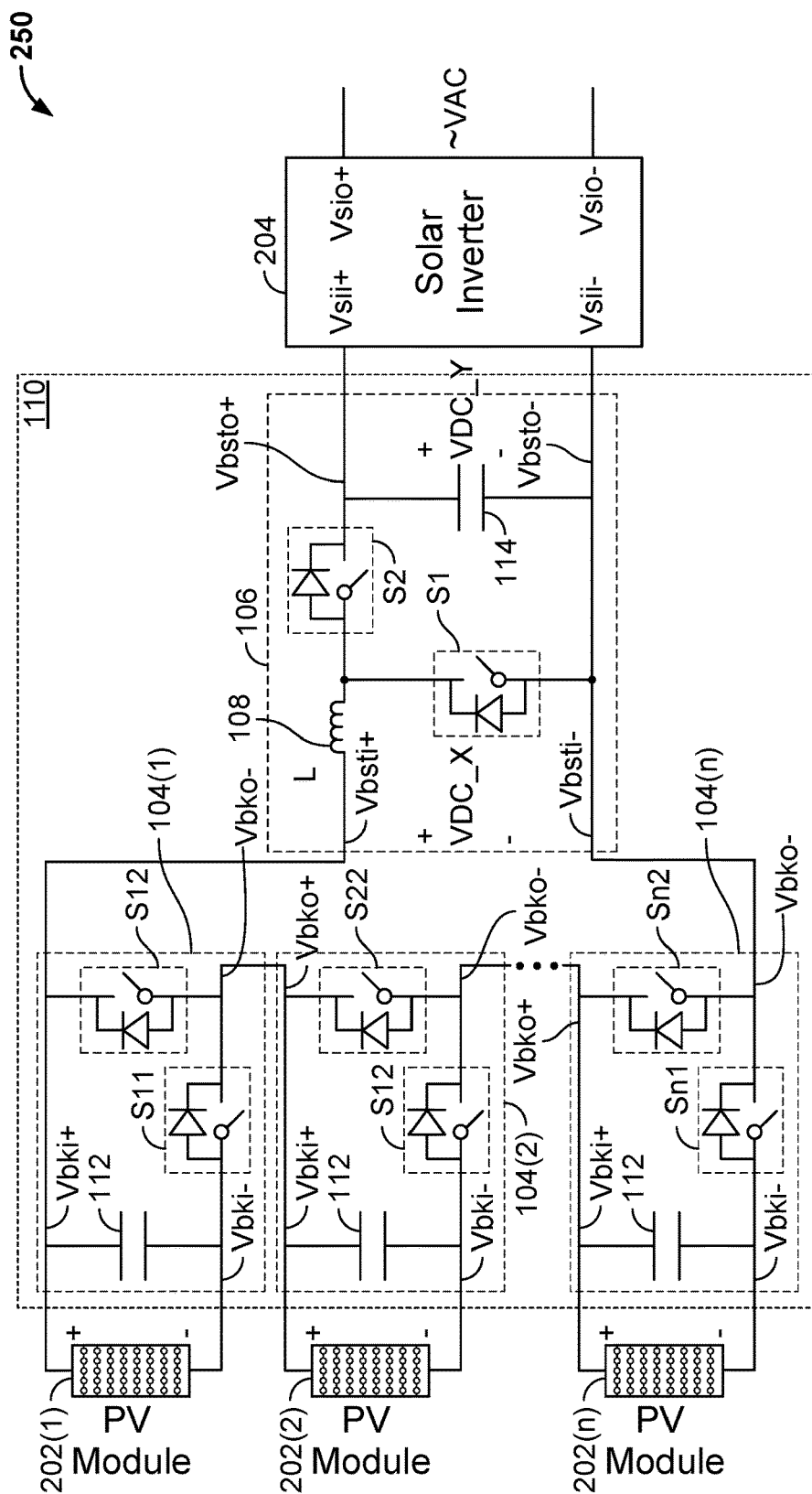
FIG. 2F depicts another embodiment of a power generation system 250 having a buck-boost optimizer.

FIG. 2F depicts another embodiment of a power generation system (or photovoltaic power system) 250 having a buck-boost optimizer 110. This system 250 is similar to the system 200 of FIG. 2E, but the buck stages 104 are constructed somewhat differently. In the embodiment of FIG. 2F, switches S11, S12, . . . Sn1 are located differently relative to the embodiment of FIG. 2E. In FIG. 2F, switches S11, S12, . . . Sn1 are located between the negative input terminal (Vbki−) of the buck stage 104 and the anode side of the diode in switch S12, S22, Sn2, respectively. Referring back to FIG. 2E, switches S11, S12, . . . Sn1 are located between the positive input terminal of the buck stage 104 and the cathode side of the diode in switch S12, S22, Sn2, respectively.

Note that the inputs (Vbki+, Vbki−) of the buck stages 104 may be connected to photovoltaic components in many ways. In one embodiment, the inputs (Vbki+, Vbki) of a buck stage 104 are across an entire photovoltaic panel. In other words, inputs (Vbki+, Vbki) of a buck stage 104 are across a single photovoltaic panel, in one embodiment. Some photovoltaic panels may have multiple DC outputs. For example, there may be multiple sets of pairs of output terminals. In this case, a separate buck stage 104 can be connected to each of the DC outputs. Thus, in one embodiment, inputs (Vbki+, Vbki) of a buck stage 104 are across sub-string of a photovoltaic panel. In some cases, a buck stage 104 can be connected to a string of photovoltaic panels. The photovoltaic panels in the string can have their outputs connected in series to form the string. However, one buck stage input (Vbki+) could be connected to a DC output of a photovoltaic panel at one end of the string, one buck stage input (Vbki−) could be connected to a DC output of a photovoltaic panel at the other end of the string. Thus, in one embodiment, inputs (Vbki+, Vbki) of a buck stage 104 are across multiple photovoltaic panels that are connected in series.

Figure 3:
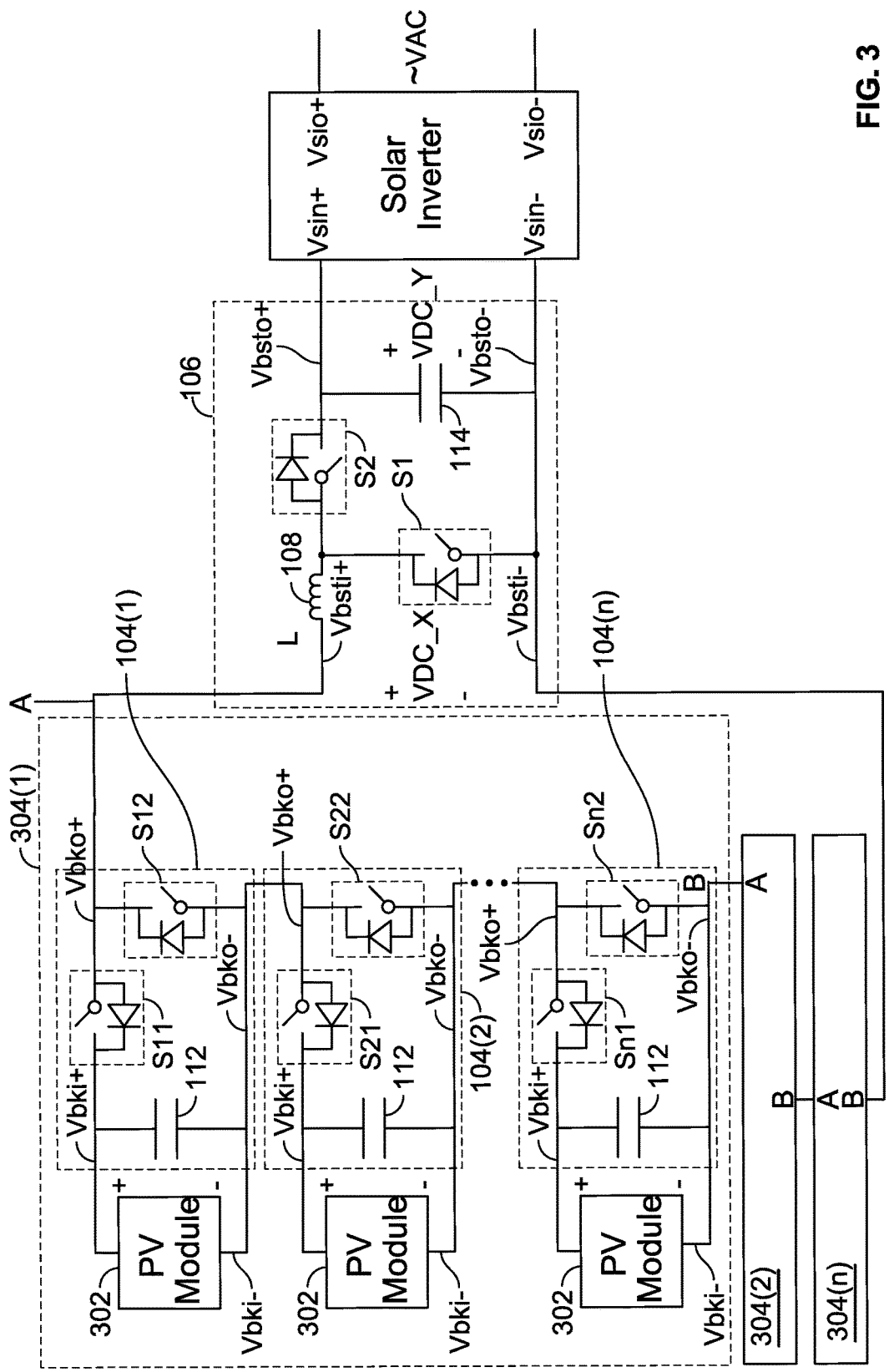
FIG. 3 is a diagram of one embodiment of a power generation system 300 having a buck-boost optimizer.

FIG. 3 is a diagram of one embodiment of a photovoltaic power system 300 having a buck-boost optimizer. The system 300 has several buck modules 304(1), 304(2) . . . 304(n). There may be more of fewer than three buck modules 304. The details of buck modules 304(2) . . . 304(n) are not depicted, but may be similar to buck module 304(1). The circuits within buck module 304(1) in this example are similar to the circuits in buck stages 104(1) . . . 104(n) in FIG. 2E. Also, the positive output terminal (Vbko+) connects to the positive input terminal (Vbsti+) of the boost stage 106. A difference is that that the negative output terminal (Vbko−) of buck stage 104(n) in buck module 304(1) does not connect to the negative terminal (Vbsti−) of the boost stage 106. Rather, the negative output terminal (Vbko−) of buck stage 104(n) in buck module 304(1) connects to the positive output terminal (Vbko+) of buck stage 104(1) in buck module 304(2). Note that buck stage 104(1) of buck module 304(2) is not depicted in FIG. 3. Instead the labels "A" are used to represent the positive output terminal (Vbko+) of buck stage 104(1) in the various buck modules 304. Also, the labels "B" are used to represent the negative output terminal (Vbko−) of buck stage 104(n) in the various buck modules 304. Thus, note that the negative output terminal (Vbko−) of buck stage 104(n) connects to the negative terminal (Vbsti−) of the boost stage 106. Therefore, the boost stage input terminals (Vbsti+, Vbsti−) are connected across the combined output of all of the buck stages 104 in all of the buck modules 304. In system 300, a buck-boost optimizer 110 comprises the buck stages 104 in the several buck modules 304(1)-304(n), as well as the boost stage 106.

Figure 4:
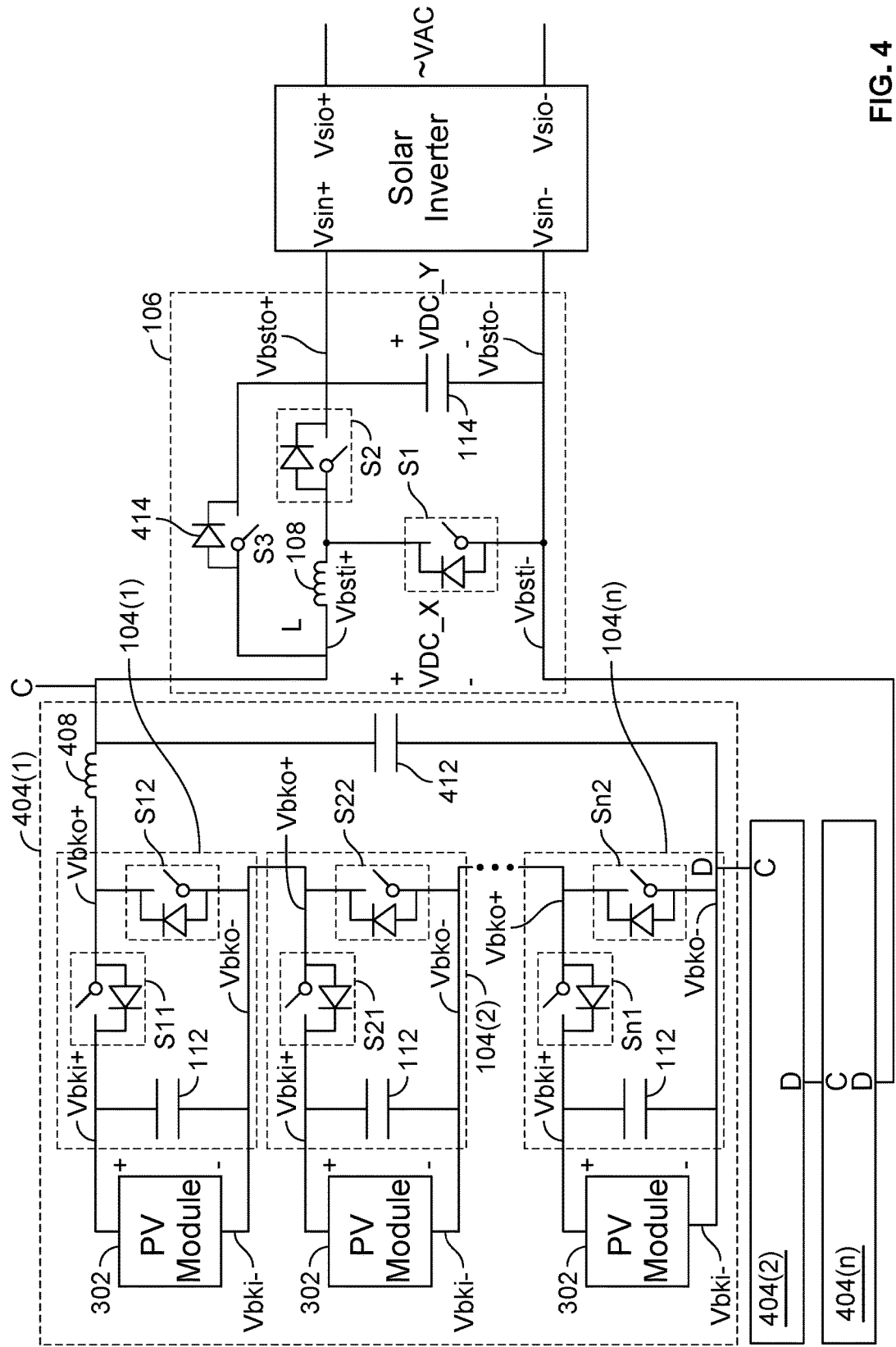
FIG. 4 is a diagram of a power generation system 400 having another configuration of buck modules and another configuration of boost stage.

FIG. 4 is a diagram of a photovoltaic power system 400 having another configuration of buck modules. In the embodiment of FIG. 4, each buck module 404 has an inductor 408 and an output capacitor 412. The inductor 408 has one terminal connected to the positive output terminal Vbko+ of buck stage 104(1) and the other terminal connected to the positive input terminal Vbsti+ of the boost stage 106. The output capacitor 412 has one terminal connected to the positive input terminal Vbsti+ of the boost stage 106 and the other terminal connected to the negative output terminal Vbko− of buck stage 104(n). Inductor 408 may serve to filter the output signal (current and/or voltage) of a buck module 404.

The boost stage 106 in FIG. 4 has a bypass switch S3. An optional diode 414 is connected in parallel with the bypass switch S3. The bypass switch S3 may be used to bypass the entire boost stage 106, including inductor 108. One reason for the inductor 408 in a buck module 404 is to filter the output signal of a buck module 404 in the event that the inductor 108 in the boost stage 106 is being bypassed.

The labels "C" and "D" are used in FIG. 4 to show how the buck stages 104 of the adjacent buck modules 404 are connected. The label "C" is at the terminal of inductor 408 that is not connected to the positive output terminal Vbko+ of buck stage 104(1). The label "D" is at the negative output terminal Vbko− of buck stage 104(*n*). Thus, the input terminals of the boost stage 106 are connected across the output capacitors 412 of the buck modules 404(1)-404(*n*).

In system 400, a buck-boost optimizer 110 comprises the buck stages 104 in the several buck modules 404(1)-404(*n*), as well as the boost stage 106.

Figure 5:
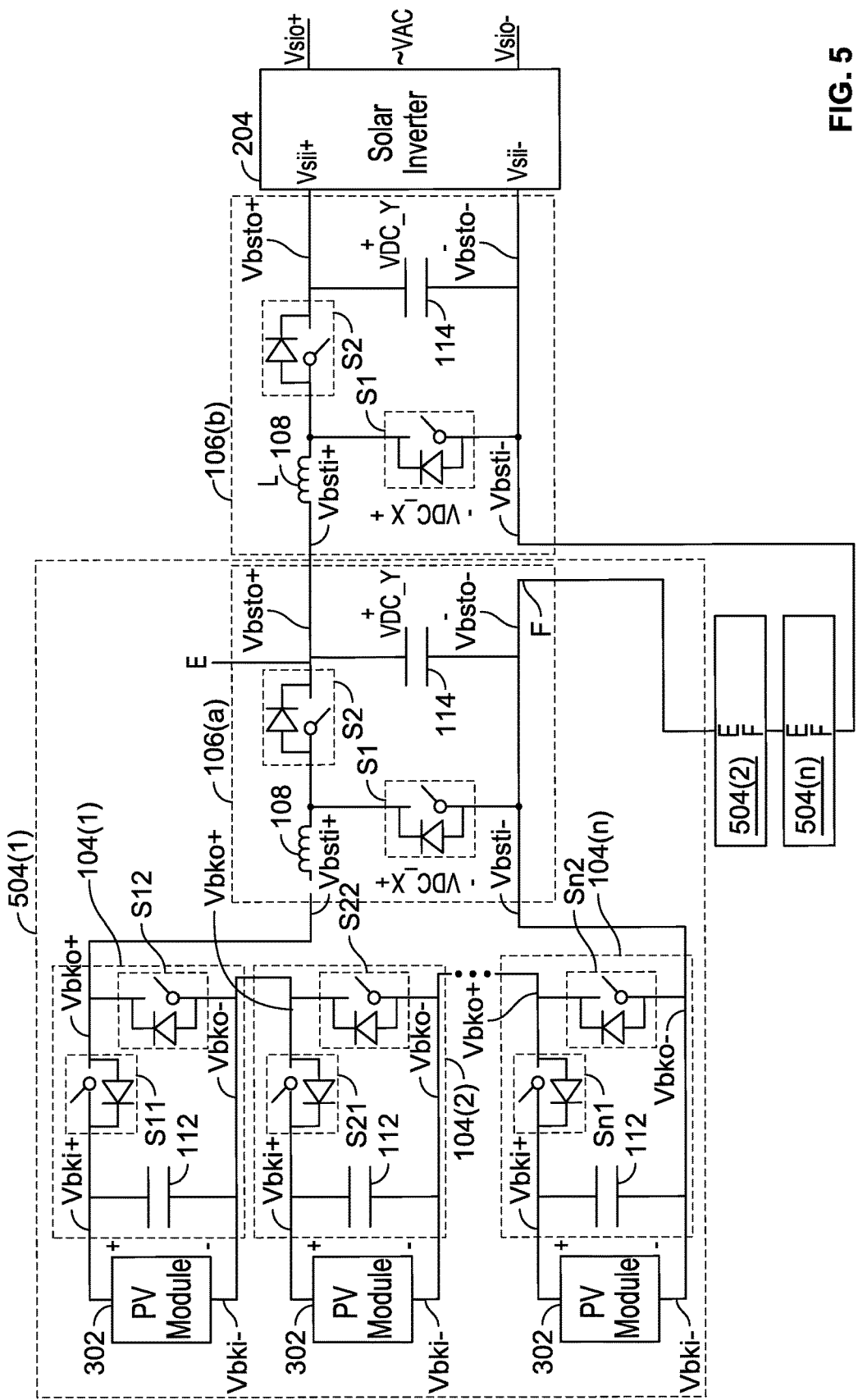
FIG. 5 depicts one embodiment of a power generation system 500 in which there are more than one boost stages.

FIG. 5 depicts one embodiment of a photovoltaic power system 500 in which there is more than one boost stage 106. Also, there are multiple buck-boost optimizers 110. The system 500 has several buck-boost modules 504(1)-504(*n*). Buck-boost module 504(1) has a buck-boost optimizer 110 connected to PV modules 302. Each PV module 302 is connected to one buck stage 104. The positive input terminal Vbsti+ of the boost stage 106(*a*) is connected to the positive output terminal Vbko+ of buck stage 104(1). The negative input terminal Vbsti− of the boost stage 106(*a*) is connected to the negative output terminal Vbko− of buck stage 104(*n*).

The labels "E" and "F" are used in FIG. 5 to show how the optimizers 110 of the adjacent buck-boost modules 504 are connected. The label "E" is at the positive output terminal Vbsto+ of boost stage 106(*a*). The label "F" is at the negative terminal Vbsto− of boost stage 106(*a*). In the embodiment of FIG. 5, multiple buck-boost optimizers 110 are connected in series within the photovoltaic power system 500.

Note that in system 500 the boost stage 106(*a*) in the buck-boost optimizer 110 is not connected directly to the solar inverter 204. Instead, the system 500 has another boost stage 106(*b*) with its output terminals connected to the solar inverter 204. The input terminals of the boost stage 106(*b*) are connected across the series of output capacitors 412 of the boost stages 106(*a*) in the buck-boost modules 504(1)-504(*n*).

Figure 6:
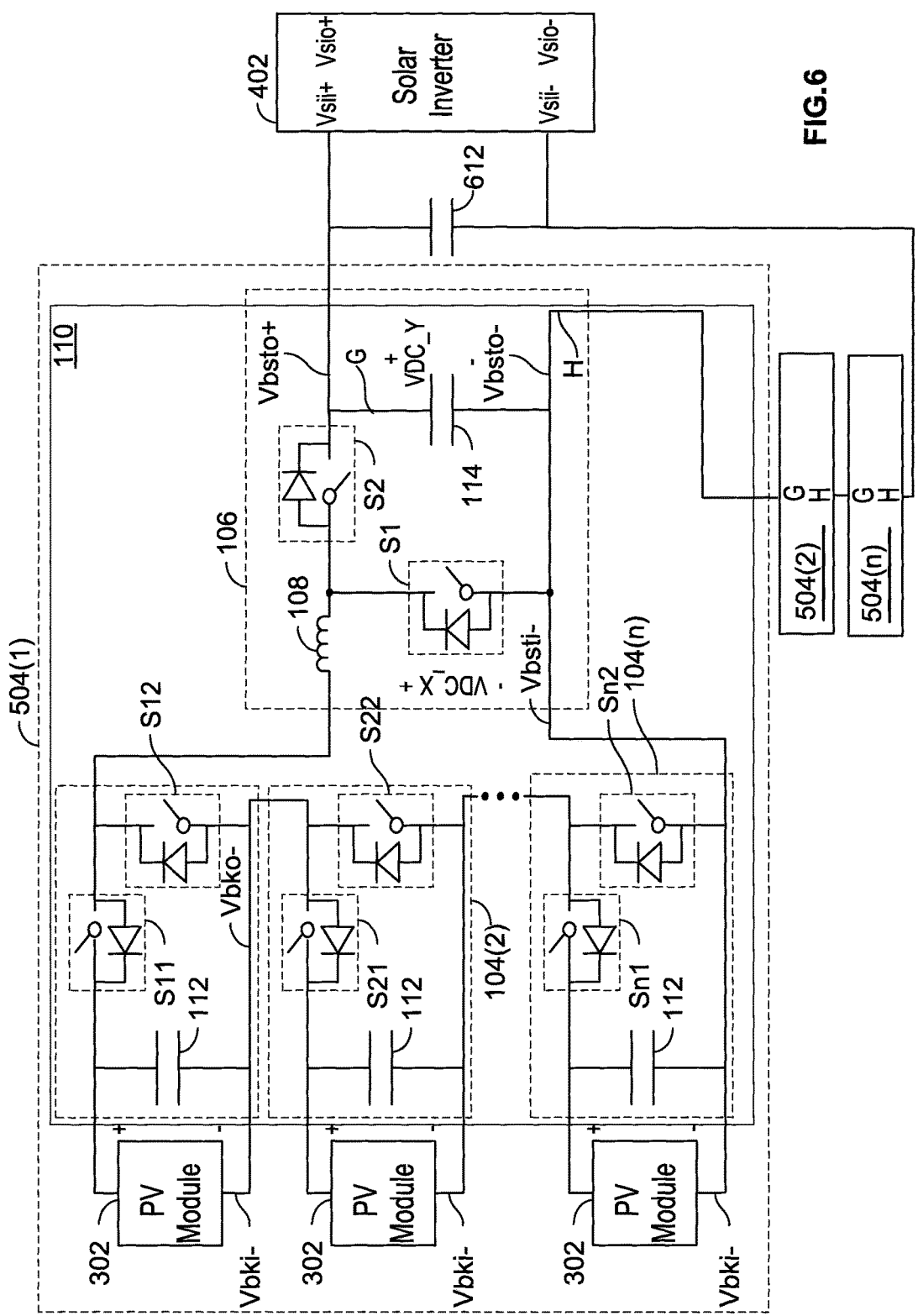
FIG. 6 depicts an embodiment of another power generation system 600 in which there are multiple boost stages.

FIG. 6 depicts an embodiment of another photovoltaic power system 600 in which there are multiple boost stages 106. Also, there are multiple buck-boost optimizers 110. In the embodiment of FIG. 6, multiple buck-boost optimizers 110 are connected in series within the photovoltaic power system 600. The system 600 in FIG. 6 differs from the one in FIG. 5 in that there is not a boost stage in system 600 that corresponds to boost stage 106(*b*) in system 500. System 600 has a capacitor 612 connected across the input terminals (Vsii+, Vsii−) of solar inverter 402. Capacitor 612 has one terminal connected to the positive output terminal Vbsto+ of the boost stage 106 in buck boost module 504(1). Capacitor 612 has one terminal connected to the negative output terminal Vbsto− of the boost stage 106 in buck boost module 504(*n*). Thus, capacitor 612 is across the series of output capacitors 114 in the boost stages 106 of all of the buck boost modules 504. Note that capacitor 612 may be integrated within the solar inverter 402.

Figure 7:
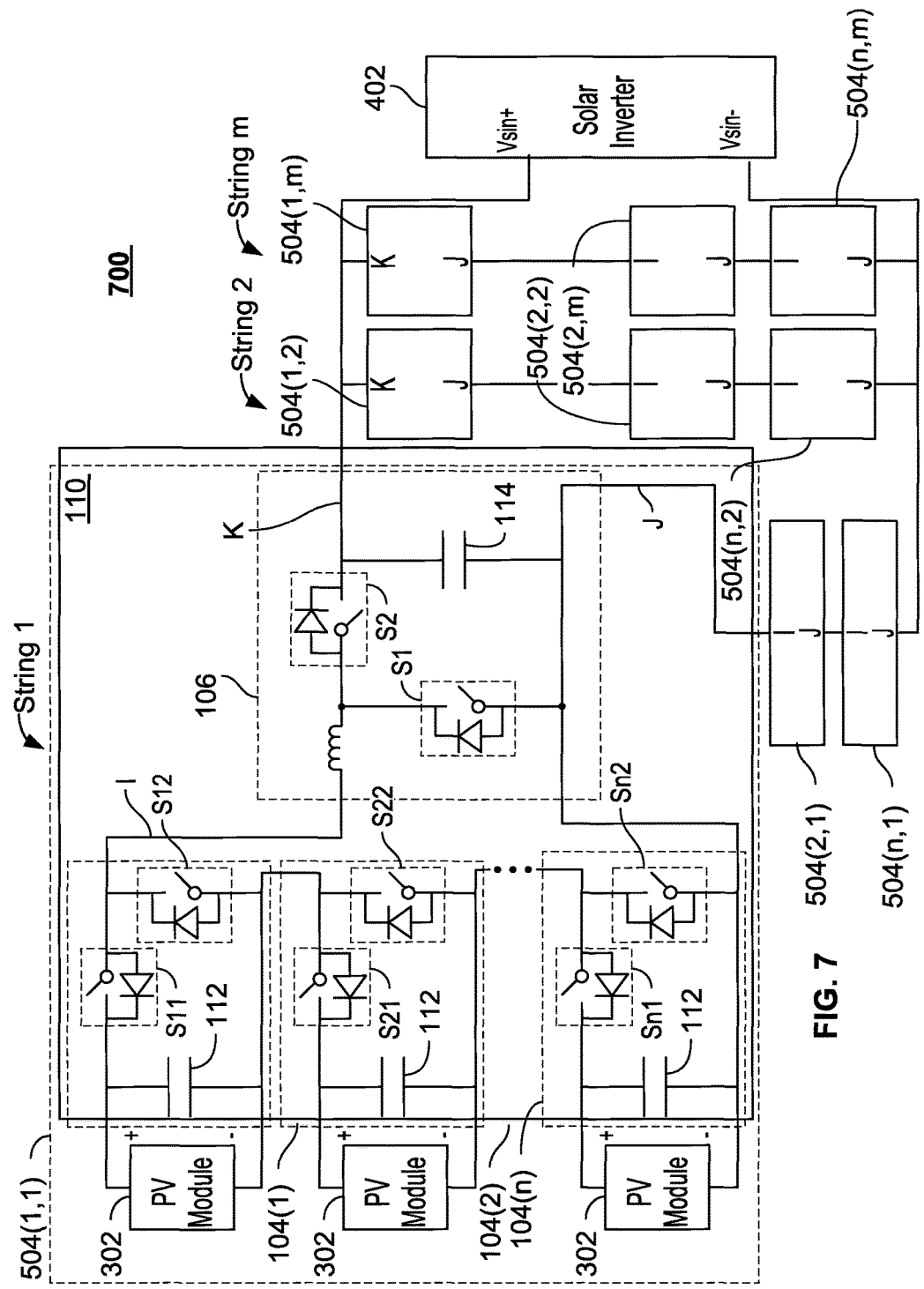
FIG. 7 depicts one embodiment of a power generation system 700 having both series and parallel connections of modules.

FIGS. 3-6 show what may be referred to various series connections of modules, which can be used to increase a combined voltage of PV modules, by allowing more PV modules to be connected. It is also possible to form parallel connections of modules, which may be used to provide more current. FIG. 7 depicts one embodiment of a photovoltaic power system 700 having both series and parallel connections of modules. The modules in system 700 may be similar to the modules in system 600. In system 700, the modules 504(1,1), 504(2,1), 504(*n*,1) are connected in series in a manner similar to the modules 504(1), 504(2), 504(*n*) in system 600. There are several "strings" (String 1, String 2, String m) of such series connected buck boost modules 504 in system 700.

In system 700, the modules 504(1,2), 504(2,2), 504(*n*,2) are connected in series in a manner similar to the modules 504(1), 504(2), 504(*n*) in system 600. In system 700, the modules 504(1,*m*), 504(2,*m*), 504(*n*,*m*) are connected in series in a manner similar to the modules 504(1), 504(2), 504(*n*) in system 600. There may be more or fewer than three such strings. The top buck-boost optimizer 110 in each string are connected together, in what is referred to herein as a parallel connection. In particular, the positive output terminal Vbsto+ of the boost stages 106 in buck-boost modules 504(1,1), 504(1,2) and 504(1,*m*) are connected together. That point is also connected to the positive input terminal Vsii+ of the solar inverter 402. The bottom buck-boost optimizer 110 in each string are connected together, in which is referred to herein as a parallel connection. In particular, the negative output terminal Vbsto− of the boost stages 106 in buck-boost modules 504(*n*,1), 504(*n*,2) and 504(*n*,*m*) are connected together. That point is also connected to the negative input terminal Vsii− of the solar inverter 402. In the embodiment of FIG. 7, multiple buck-boost optimizers 110 are connected in series and multiple buck-boost optimizers 110 are connected in parallel within the photovoltaic power system 700.

Thus, the input terminals of the solar inverter 402 are connected across the series connection of the output capacitors 114 of the boost stage 106 in String 1. Likewise, the input terminals of the solar inverter 402 are connected across the series connection of the output capacitors 114 of the boost stage 106 in String 2. Likewise, the input terminals of the solar inverter 402 are connected across the series connection of the output capacitors 114 of the boost stage 106 in String m.

Moreover, each string is able to provide its own string current. Thus, String 1 provides a string current, String 2 provides a string current, and String m provides a string current. These three string currents may add up such that the system 700 is able to increase the amount of current provided to the solar inverter 402.

Figure 8:
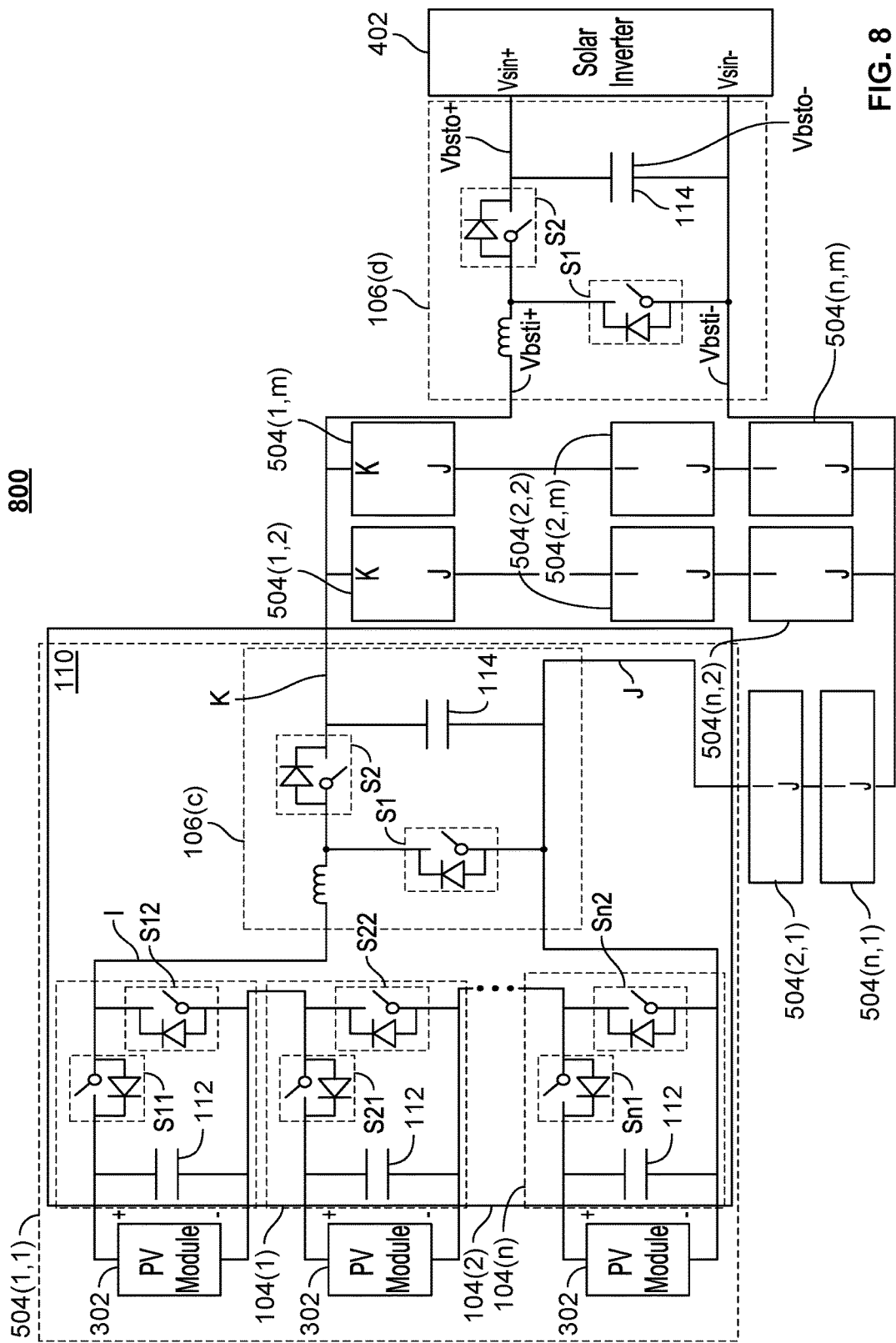
FIG. 8 depicts an embodiment of another power generation system 800 in which there are many buck-boost modules connected together.

FIG. 8 depicts an embodiment of another photovoltaic power system 800 in which there are many buck-boost modules 504 connected together. System 800 differs from system 700 in that there is a boost stage 106(*d*) between the solar inverter 402 and the collection of buck-boost modules 504. The positive output terminal Vbsto+ of boost stage 106*d* is connected to the positive input terminal Vsii+ of the solar inverter 402. The negative output terminal Vbsto− of boost stage 106*d* is connected to the negative input terminal Vsii− of the solar inverter 402.

The positive output terminal Vbsto+ of the boost stages 106*c* in buck-boost modules 504(1,1), 504(1,2) and 504(1,*m*) are connected together. That point is also connected to the positive input terminal Vbsti+ of the boost stage 106*d*. The negative output terminal Vbsto− of the boost stages 106*c* in buck-boost modules 504(*n*,1), 504(*n*,2) and 504(*n*,*m*) are connected together. That point is also connected to the negative input terminal Vbsti− of the boost stage 106*d*. In the embodiment of FIG. 8, multiple buck-boost optimizers 110 are connected in series and multiple buck-boost optimizers 110 are connected in parallel within the photovoltaic power system 800.

The power generation systems in FIGS. 2E, 2F, 3, 4, 5, 6, 7, and 8 each have at least one buck-boost optimizer 110. The switches are depicted in the buck-boost optimizers 110 in FIGS. 2E, 2F, 3, 4, 5, 6, 7, and 8 in a similar manner as the switches in the buck-boost optimizer 110 of FIG. 2A. Those of ordinary skill in the art will appreciate that the discussion of the circuit elements in FIGS. 2B, 2C and 2D applies to the buck-boost optimizers 110 in FIGS. 2E, 2F, 3, 4, 5, 6, 7, and 8. Thus, the switches depicted in the buck-boost optimizers 110 in FIGS. 2E, 2F, 3, 4, 5, 6, 7, and 8 can be implemented with circuit elements in FIGS. 2B, 2C and 2D similar to the buck-boost optimizer 110 of FIG. 2A.

Figure 9:
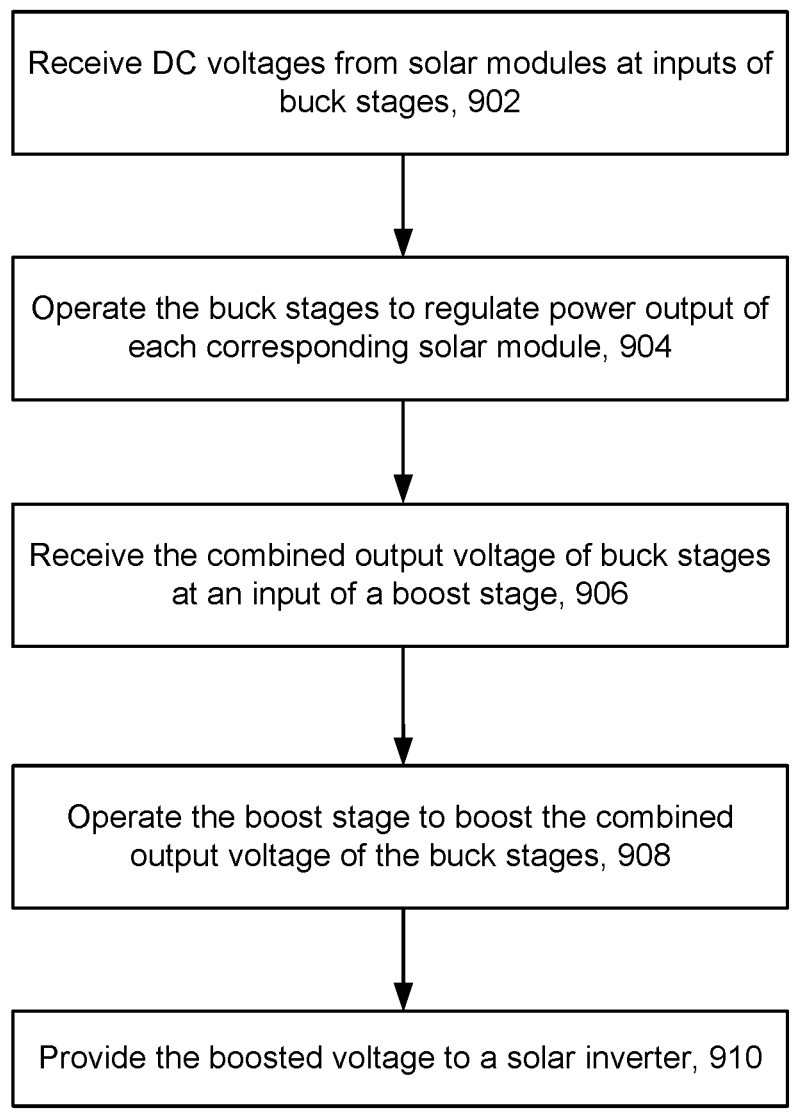
FIG. 9 is a flowchart of one embodiment of a process 900 of operating a buck-boost optimizer.

FIG. 9 is a flowchart of one embodiment of a process 900 of operating a buck-boost optimizer. The process 900 may be used to operate any of the buck-boost optimizers in FIGS. 1, 2A, 2E, 2F, 3-8, but is not limited thereto. Step 902 includes receiving DC voltages from each of respective ones of a plurality of photovoltaic modules at a corresponding plurality of inductorless buck stages.

Step 904 includes operating each of the plurality of inductorless buck stages to regulate a power output of the corresponding photovoltaic modules. Step 904 may include generating an output voltage for each buck stage 104. Step 904 may include generating an output current for a set of buck stages 104. In one embodiment, an output current is generated for a string of buck stages. Step 904 may include operating each buck stage independently from the others to independently control a pulse width modulation of the buck stage. Step 904 may include operating each photovoltaic module at a maximum power point, or at least attempting to maximize a power output of each photovoltaic module.

Step 906 includes receiving a combined output voltage from all of the plurality of buck stages at an input of a boost stage. Referring to FIGS. 2A, 2E, and 2F, the boost stage 106 receives a combined output voltage from buck stages 104(1)-104(n). Referring to FIG. 3, the boost stage 106 receives a combined output voltage from buck stages 104(1)-104(n) in each buck module 304(1)-304(n). Referring to FIG. 4, the boost stage 106 receives a combined output voltage from buck stages 104(1)-104(n) in each buck module 404(1)-404(n). Referring to FIG. 5, the boost stage 106a in the buck boost module 504 receives a combined output voltage from buck stages 104(1)-104(n) in that buck boost module 504. Referring to FIG. 6, the boost stage 106 in the buck boost module 504 receives a combined output voltage from buck stages 104(1)-104(n) in that buck boost module 504. Referring to FIG. 7, the boost stage 106 in the buck boost module 504 receives a combined output voltage from buck stages 104(1)-104(n) in that buck boost module 504. Referring to FIG. 8, the boost stage 106(c) in the buck boost module 504 receives a combined output voltage from buck stages 104(1)-104(n) in that buck boost module 504.

Step 908 includes operating the boost stage to boost the combined output voltage from the buck stages. Step 908 may include controlling the duty cycle of boost stage 106. Step 908 may include reducing the voltage at the input terminals of the boost stage relative to the voltage at the output terminals of the boost stage 106.

Step 910 includes providing the boosted voltage to a solar inverter.

In some embodiments, the output voltages of the buck stages 104 are interleaved. Interleaving the output voltages may reduce ripple in the inductor 108 in the boost stage 106. FIGS. 10A-13C show various signals to help illustrate.

Figure 10A:
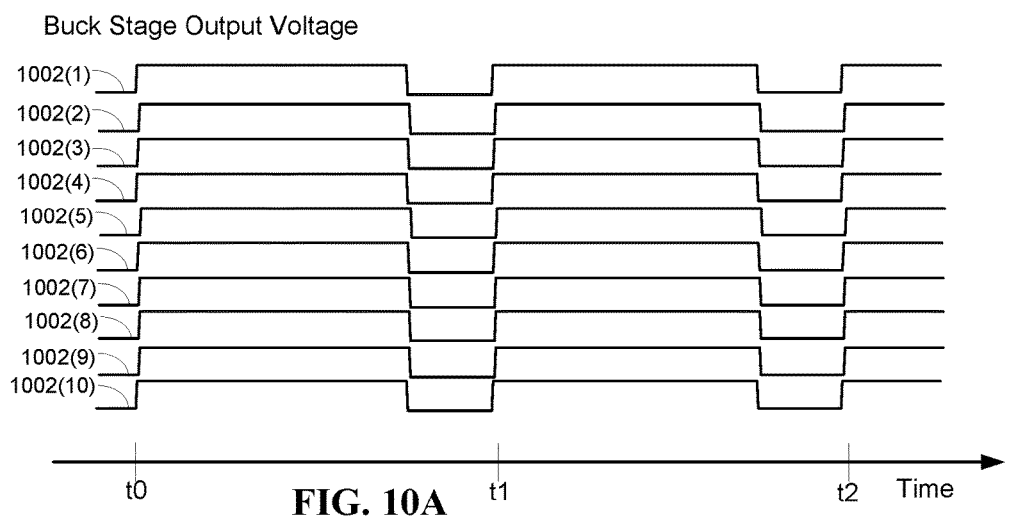
FIG. 10A depicts output voltage of a set of buck stages.

FIG. 10A depicts output voltage of a set of buck stages. In this example, the individual output voltages 1002(1)-1002(10) of ten buck stages are represented. In this example, all buck stages presently have the same duty cycle. The duty cycle is reflected by the high and low levels of each of the individual output voltages 1002(1)-1002(10). Also, the buck stages are synchronized, by which it is meant that they are operated at the same frequency. In other words, the output voltages 1002 have the same period. One period is between time t0 and t1, a second period is between time t1 and t2. Furthermore, the output voltages 1002(1)-1002(10) are not interleaved. For each output voltage 1002(1)-1002(10), the pulse begins at the same time (e.g., t0, t1, t2). Because the duty cycle is the same for each buck stage, the pulse ends at the same time for each output voltages 1002(1)-1002(10).

Figure 10B:
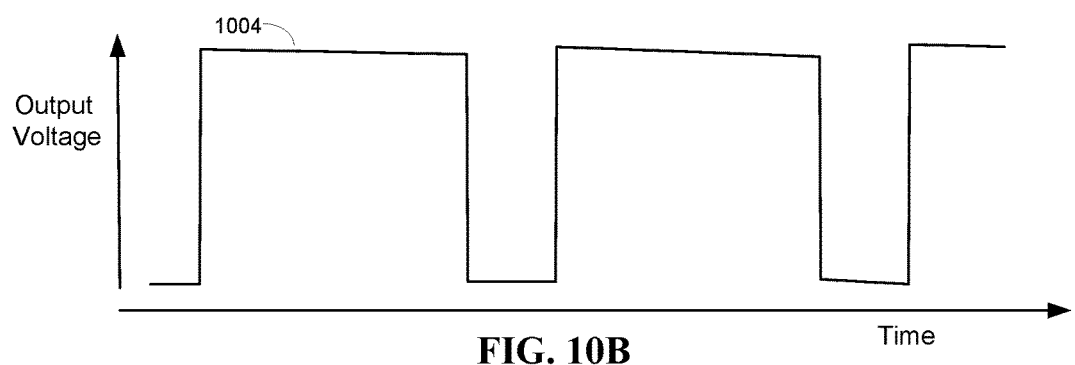
FIG. 10B depicts the combined output voltages of the ten buck stages whose output voltages are depicted in FIG. 10A.

FIG. 10B depicts the combined output voltages of the ten buck stages whose output voltages 1002 are depicted in FIG. 10A. Because the output voltages 1002(1)-1002(10) are not interleaved, the output voltage 1004 varies between a very low and a very high value. For example, the low value might be 0 V and the high value might be 200 V.

Figure 10C:
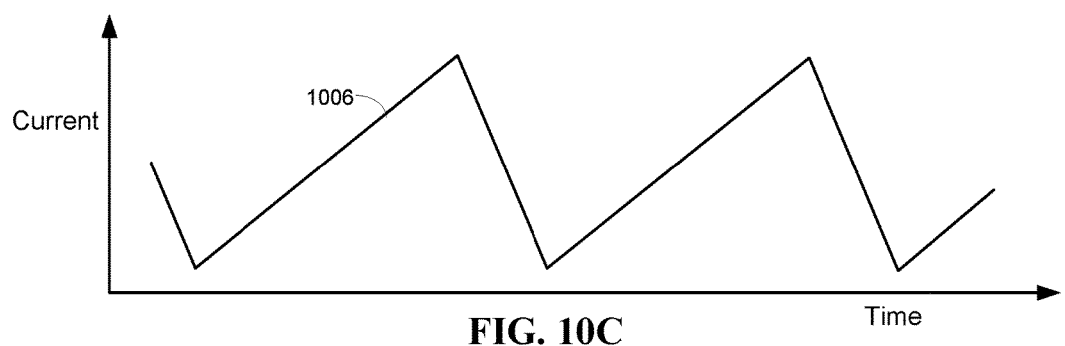
FIG. 10C depicts current through the inductor in the boost stage for the example of FIGS. 10A and 10B.

FIG. 10C depicts current through the inductor 108 in the boost stage 106 for the example of FIGS. 10A and 10B. Because the output voltages 1002(1)-1002(10) are not interleaved, the current may vary significantly between the low and high points. For example, the current may vary between about 9.5 A and 10.5 A. Thus, the range from maximum to minimum current might be about 1 A.

Figure 11A:
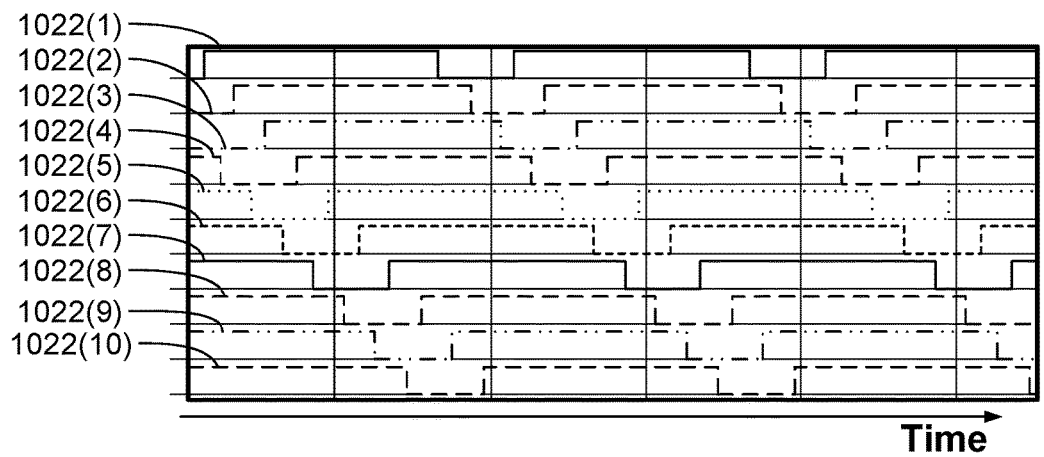
FIG. 11A depicts output voltage of a set of buck stages, in which the output voltages are interleaved.

FIG. 11A depicts output voltage of a set of buck stages, in which the output voltages are interleaved In this example, the individual output voltages 1022(1)-1022(10) of ten buck stages are represented. In this example, all buck stages presently have the same duty cycle. The duty cycle is reflected by the high and low levels of each of the individual output voltages 1022(1)-1022(10). Also, the buck stages are synchronized, by which it is meant that they are operated at the same frequency. However, unlike the example of FIG. 10A, the output voltages 1022(1)-1022(10) are interleaved. For each output voltage 1022(1)-1022(10), the pulse begins at a different point in time.

Figure 11B:
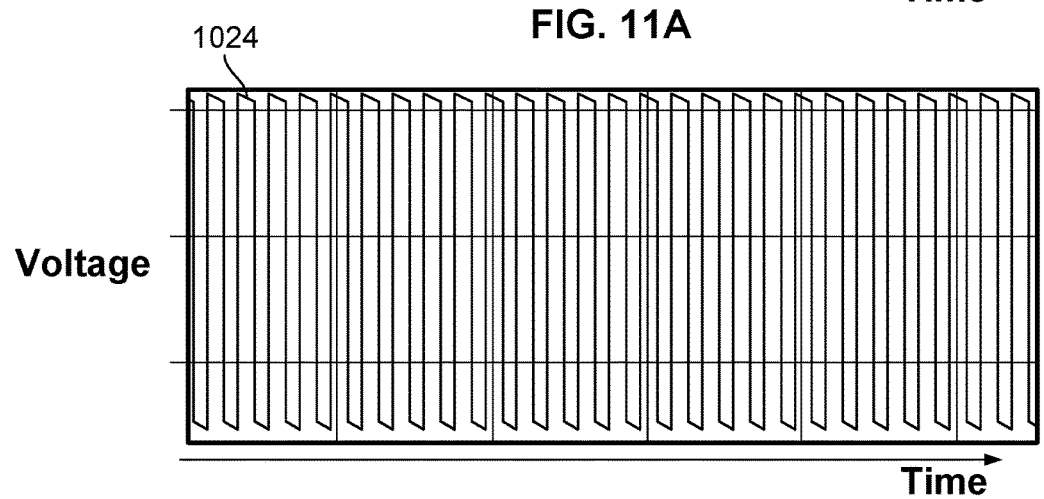
FIG. 11B depicts the combined output voltages of the ten buck stages whose output voltages are depicted in FIG. 11A.

FIG. 11B depicts the combined output voltages of the ten buck stages whose output voltages 1022 are depicted in FIG. 11A. Because the output voltages 1022(1)-1022(10) are interleaved, the magnitude of the output voltage 1024 does not vary as much as in the example of FIG. 10B. For example, the low value might be 190 V and the high value might be 210 V.

Figure 11C:
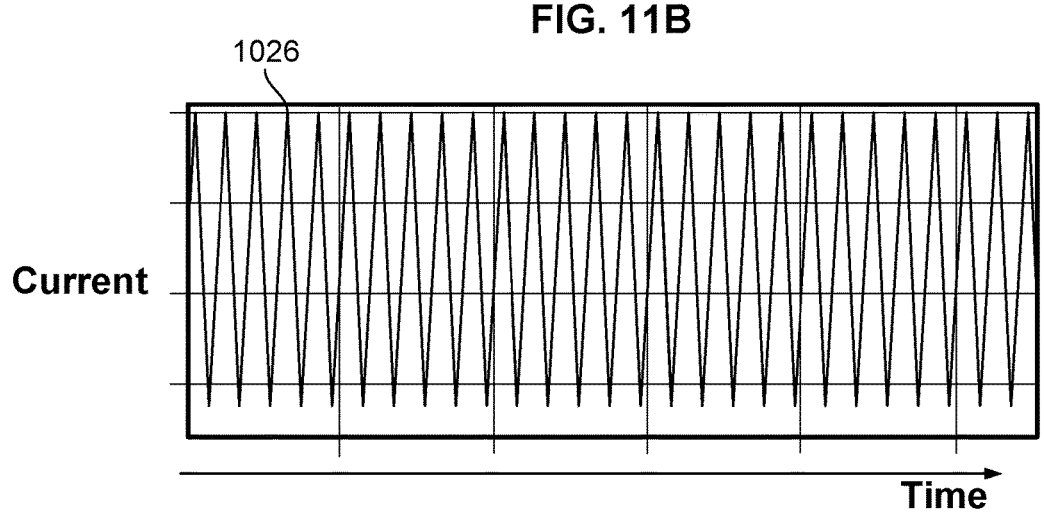
FIG. 11C depicts current through the inductor in the boost stage for the example of FIGS. 11A and 11B.

FIG. 11C depicts current through the inductor 108 in the boost stage 106106 for the example of FIGS. 11A and 11B. Because the output voltages 1022(1)-1022(10) are interleaved, the current may vary significantly between the low and high points. For example, the current may vary between about 9.965 A and 9.98 A. Thus, the range from maximum to minimum current might be about 0.015 A.

FIGS. 10A-11C represented cases in which the buck stages had the same duty cycle. FIGS. 12A-13C represent cases in which the buck stages have different duty cycles. Note that in order to maximize the power output of each of the photovoltaic modules, the corresponding buck stages may need to be operated are different duty cycles. One reason why various photovoltaic modules might need to be operated differently is that the various photovoltaic modules may receive different amounts of sunlight due to factors such as shading.

Figure 12A:
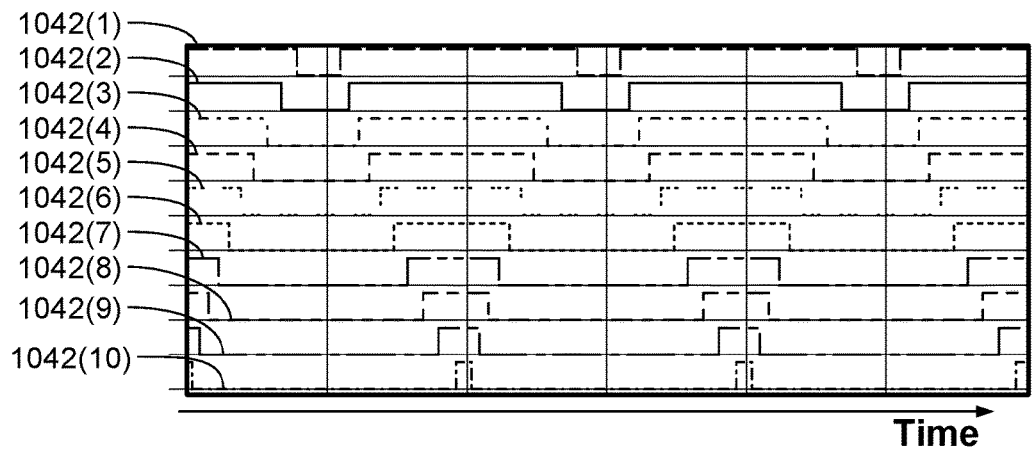
FIG. 12A depicts output voltage of a set of buck stages.

FIG. 12A depicts output voltage of a set of buck stages. In this example, the individual output voltages 1042(1)-1042(10) of ten buck stages are represented. In this example, the buck stages each have a different duty cycle. The duty cycle is reflected by the high and low levels of each of the individual output voltages 1042(1)-1042(10). Also, the buck stages are synchronized, by which it is meant that they are operated at the same frequency. Furthermore, the output voltages 1042(1)-1042(10) are not interleaved.

Figure 12B:
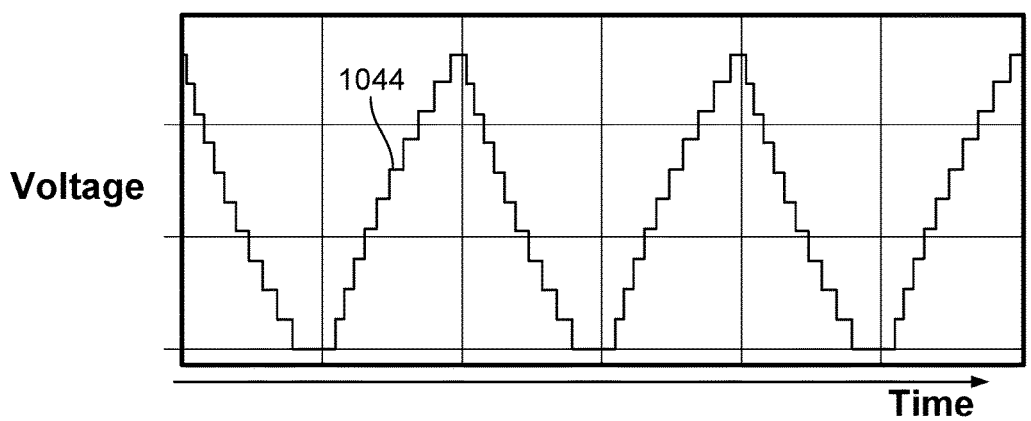
FIG. 12B depicts the combined output voltages of the ten buck stages whose output voltages 1042 are depicted in FIG. 12A.

FIG. 12B depicts the combined output voltages of the ten buck stages whose output voltages 1042 are depicted in FIG. 12A. Because the output voltages 1042(1)-1042(10) are not interleaved and the buck stages have different duty cycles, the output voltage 1044 varies between a very low and a very high value. For example, the low value might be 0 V and the high value might be 250 V. Note that this variance could be more than the case in FIG. 10B in which the buck stages have the same duty cycle.

Figure 12C:
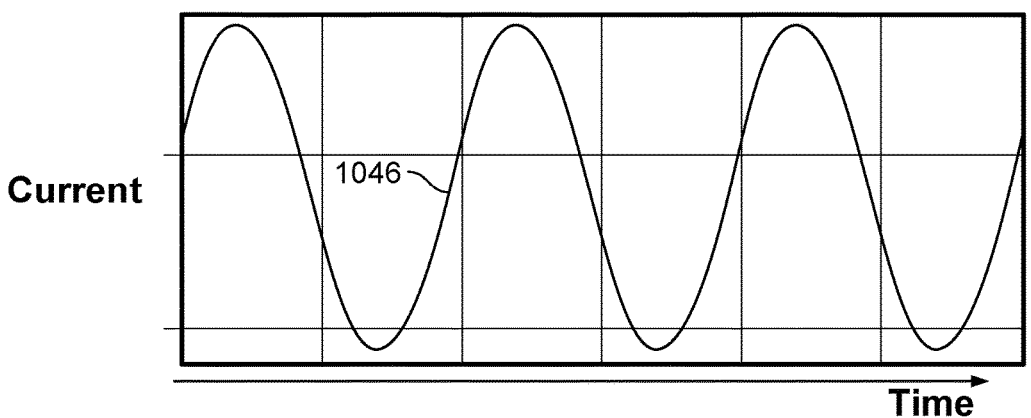
FIG. 12C depicts current through the inductor in the boost stage for the example of FIGS. 12A and 12B.

FIG. 12C depicts current through the inductor 108 in the boost stage 106 for the example of FIGS. 12A and 12B. Because the output voltages 1042(1)-1042(10) are not interleaved and the buck stages have different duty cycles, the current may vary significantly between the low and high points. For example, the current may vary between about 8.5 A and 9.5 A. Thus, the range from maximum to minimum current might be about 1 A.

Figure 13A:
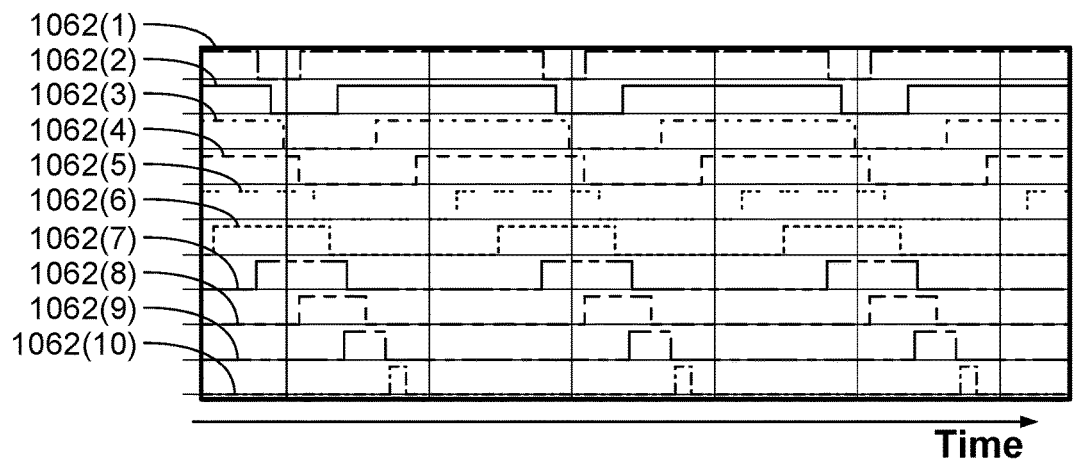
FIG. 13A depicts output voltage of a set of buck stages, in which the output voltages are interleaved but the buck stages have different duty cycles.

FIG. 13A depicts output voltage of a set of buck stages, in which the output voltages are interleaved but the buck stages have different duty cycles. In this example, the individual output voltages 1062(1)-1062(10) of ten buck stages are represented. In this example, the buck stages each have a different duty cycle. The duty cycle is reflected by the high and low levels of each of the individual output voltages 1062(1)-1062(10). Also, the buck stages are synchronized, by which it is meant that they are operated at the same frequency. However, unlike the example of FIG. 12A, the output voltages 1062(1)-1062(10) are interleaved.

Figure 13B:
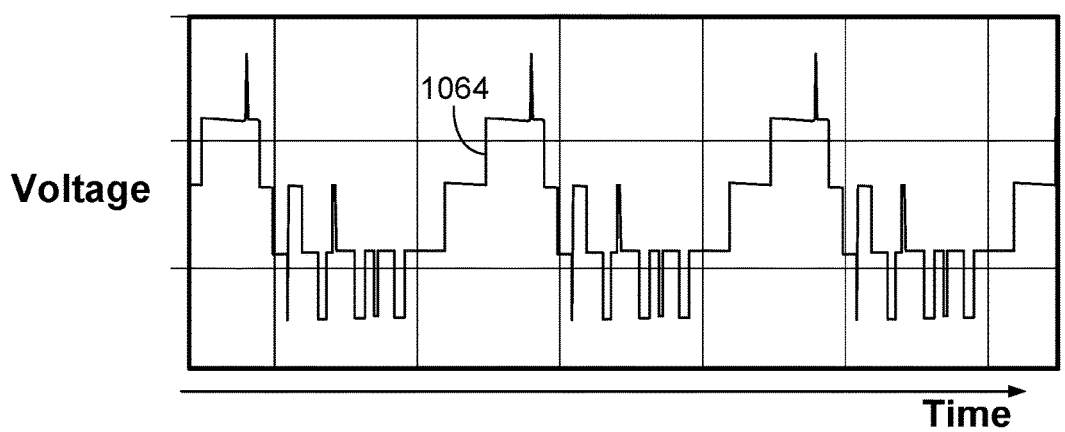
FIG. 13B depicts the combined output voltages of the ten buck stages whose output voltages 1062 are depicted in FIG. 13A.

FIG. 13B depicts the combined output voltages of the ten buck stages whose output voltages 1062 are depicted in FIG. 13A. Because the output voltages 1062(1)-1062(10) are interleaved, the output voltage 1064 does not vary as much between high and low (relative to FIG. 12B), despite the different duty cycles. For example, the low value might be 80 V and the high value might be 180 V. Note that this variance could be less than the case in FIG. 12B in which the buck stage outputs are not interleaved.

Figure 13C:
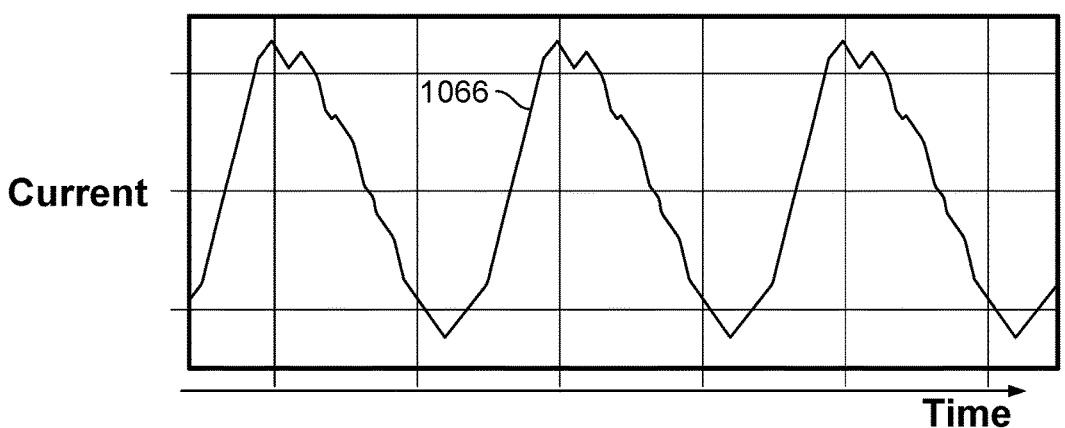
FIG. 13C depicts current through the inductor in the boost stage for the example of FIGS. 13 A and 13B.

FIG. 13C depicts current through the inductor 108 in the boost stage 106 for the example of FIGS. 13 A and 13B. Because the output voltages 1062(1)-1062(10) are interleaved, the current may vary less than the example of FIG. 12B. For example, the current may vary between about 8.8 A and 9.1 A. Thus, the range from maximum to minimum current might be about 0.3 A.

Figure 14A:
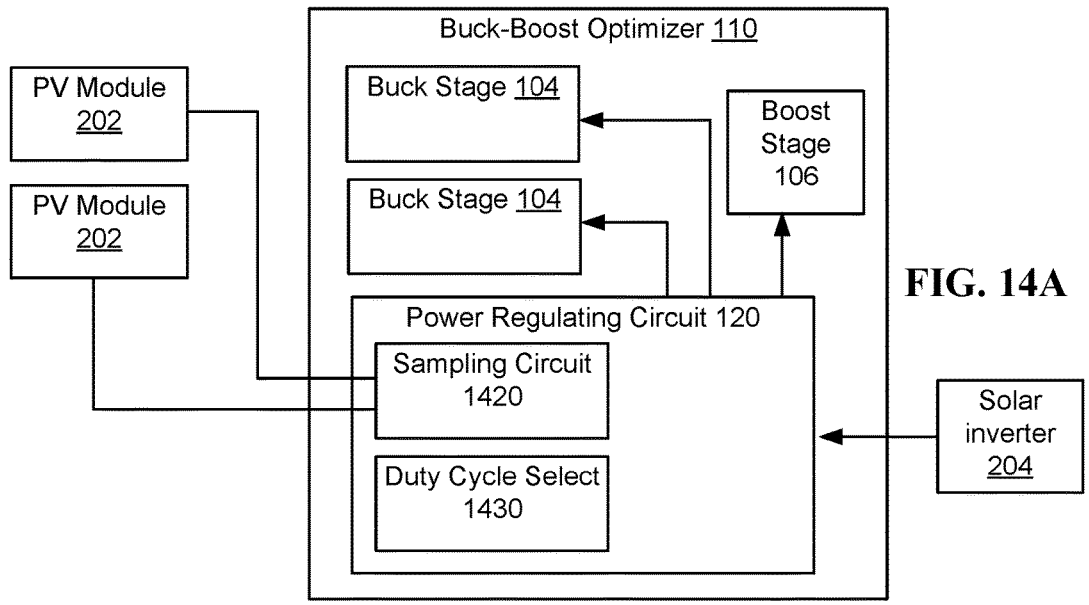
FIG. 14A is a diagram of one embodiment of a power generation system having a buck-boost optimizer, PV modules, and a solar inverter.

FIG. 14A is a diagram of one embodiment of a photovoltaic power system having a buck-boost optimizer 110, PV modules 202, and a solar inverter 204. The power regulating circuit 120 has a sampling circuit 1420 and a duty cycle select 1430 element. The sampling circuit 1420 is configured to sample a signal (e.g., current and/or voltage) at outputs of the PV modules 202. The duty cycle select 1430 element is configured to select a duty cycle for each of the buck stages 104. The duty cycle for each buck stage 104 may be based on the signal sampled from the corresponding PV module 202. In one embodiment, the power regulating circuit 120 is configured to control a duty cycle of each buck stage to regulate power output of the corresponding PV module 202. The power regulating circuit 120 may be implemented by a combination of hardware and/or software. The processing unit 1500 of FIG. 15 may be used to implement at least a portion of power regulating circuit 120.

The duty cycle select 1430 is also configured to select a duty cycle at which to operate the boost stage 106. In one embodiment, the duty cycle select 1430 is configured to operate the boost stage 106 in either a boost mode or a bypass mode. The power regulating circuit 120 may respond to a signal from the solar inverter 204 to determine whether to operate the boost stage 106 in either a boost mode or a bypass mode. The power regulating circuit 120 may respond to a signal from one of the buck stages 104 to determine whether to operate the boost stage 106 in either a boost mode or a bypass mode. Further details of one embodiment are discussed in connection with the process depicted in FIG. 14B.

Figure 14B:
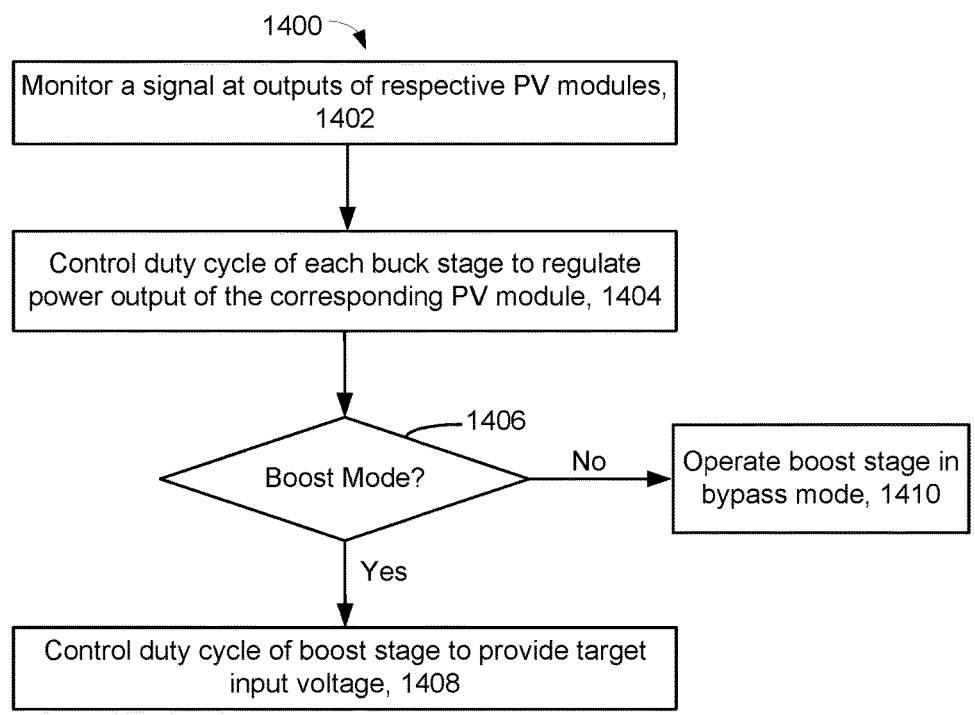
FIG. 14B is a flowchart of one embodiment of a process of operating a buck-boost optimizer.

FIG. 14B is a flowchart of one embodiment of a process 1400 of operating a buck-boost optimizer 110. The process 1400 will be discussed with reference to the system in FIG. 14A, but process 1400 is not limited to that system. Step 1402 includes monitoring a signal at an output of respective photovoltaic modules. For example, a current and/or a voltage at a DC output of each PV module 202 may be sampled by sampling circuit 1420.

Step 1404 includes controlling a duty cycle of buck stages to regulate a power output of the corresponding PV module. Process 1400 is not limited to any particular technique to regulate the power outputs of the PV modules. In some embodiments steps 1402 and 1404 are used together to attempt to operate each PV module at a maximum power point. As one example, a hill climbing technique may be used in steps 1402-1404. One example of a hill climbing technique is commonly referred to as "perturb and observe". In perturb and observe, the power regulating circuit 120 may adjust the duty cycle of a given buck stage 104 slightly and observe the impact on current and voltage (and hence power) output by the corresponding PV module. Such adjustments may be made until a maximum power point is located. Since environmental conditions (e.g., solar radiation, operating temperature) may change over time, the power regulating circuit 120 may once again seek a maximum power point at periodic intervals. Many techniques other than perturb and observe may be used. Step 1404 may include duty cycle select 1430 sending a control signal to each of the buck stages 104. This control signal may indicate when switches S11 and S12 in buck stage 104(1) are to be opened and closed. A similar control signal may be sent to other buck stages 104(2)-104(n). In one embodiment, the control signal simply indicates when switch S11 is to open and close (as switch S12 can be implemented by a diode without an active switch).

Step 1406 includes a determination of whether the boost stage 106 should be operated in a boost mode or a bypass mode. In the boost mode, the voltage at the input terminals (e.g., Vbsti+, Vbsti-) of the boost stage 106 is less than the voltage at the output terminals (e.g., Vbsto+, Vbsto-) of the boost stage 106. In the bypass mode, the voltage at the input terminals (e.g., Vbsti+, Vbsti-) is substantially the same as the voltage at the output terminals (e.g., Vbsto+, Vbsto-). By "substantially the same" it is meant that the same voltage is targeted at the input and output, but due to factors such as non-ideal circuit elements, there may be some difference in the input and output voltages. For example, there may be some resistance along a conductive path between the input and output of the boost stage 106, wherein there may be a voltage drop between the input and output of the boost stage 106.

A variety of techniques may be used to determine whether the boost stage 106 of the buck-boost optimizer 110 should operate in a boost mode or a bypass mode. In one embodiment, the solar inverter 204 determines whether it is having difficulty maintaining the voltage at its input terminals (e.g., Vsii+, Vsii-). Note that the solar inverter 204 may be configured to attempt to regulate the voltage at its input terminals (e.g., Vsii+, Vsii-) to some target voltage, such as 350 V. If the solar inverter 204 is not able to maintain the voltage at its input terminals (e.g., Vsii+, Vsii-) at that target, the solar inverter might not operate efficiently and/or might not be able to provide a suitable AC voltage at its output terminals (e.g., Vsio+, Vsio-). Thus, in one embodiment, the solar inverter 204 sends a signal to the power regulating circuit 120 when the solar inverter 204 is having trouble maintaining the voltage at its input terminals (e.g., Vsii+, Vsii−). In one embodiment, the power regulating circuit 120 determines that the boost stage 106 should be operated in the boost mode responsive to a determination that the DC voltage at the input of the solar inverter (or DC to AC converter) does not meet a criterion.

In one embodiment, the power regulating circuit 120 determines that the boost stage 106 should be operated in the boost mode responsive to some condition of the buck stages 104. In one embodiment, the power regulating circuit 120 determines that the combined output voltage of the buck stages 104 will need to fall below the present input voltage of the boost stage 106 in order to maintain target duty cycles of the buck stages. For example, in order to maintain a target power efficiency at least some of the buck stages may need to be operated at a fairly high duty cycle. This means that the combined output voltage of the buck stages may need to fall below the present input voltage of the boost stage.

Responsive to a determination in step 1406 that the boost stage 106 should be operated in a boost mode, the duty cycle of the boost stage 106 is controlled in step 1408 to provide a target input voltage of the boost stage 106. In one embodiment, the power regulating circuit 120 sends a control signal to the boost stage 106 to control a duty cycle of boost stage 106. This control signal may indicate when switches S1 and S2 are to be opened and closed.

Responsive to a determination in step 1406 that the boost stage 106 should be operated in a bypass mode, the boost stage 106 is operated in the bypass mode in step 1410. In one embodiment, the power regulating circuit 120 sends a control signal to the boost stage 106 to indicate a bypass mode. In one embodiment, the bypass mode is selected by keeping switch S1 open all the time and switch S2 closed all the time.

In one embodiment, the boost stage 106 has a circuit element that allows the inductor 108 to be bypassed. With reference to FIG. 4, switch S3 allows the inductor 108 (as well as switch S2) to be bypassed. Thus, in one embodiment, switch S3 is closed and switch S2 is open in the bypass mode. Closing switch S3 may connect the positive input terminal (Vbsti−) to the positive output terminal (Vbsto+).

Figure 15:
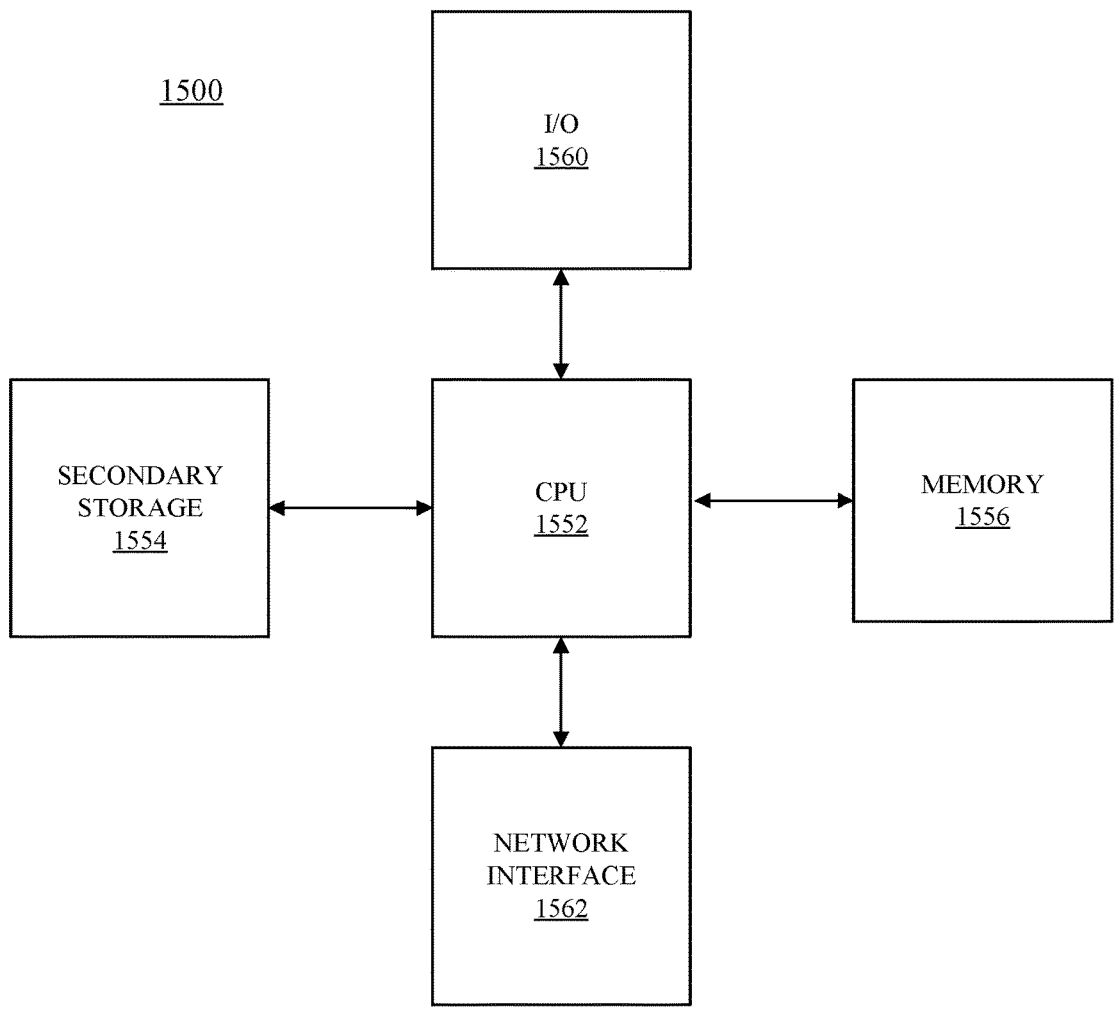
FIG. 15 is an example processing unit that may be used within a power generation system.

FIG. 15 is an example processing unit 1500. Specific devices (e.g., buck-boost optimizer 110, solar inverter 204) may utilize all of the components shown, or only a subset of the components, and levels of integration may vary from device to device. In one embodiment, all or a portion of the power regulating circuit 120 is implemented by processing unit 1500. Furthermore, a device may contain multiple instances of a component, such as multiple processing units, processors, memories, transmitters, receivers, etc. The processing unit 1500 may comprise one or more input/output (I/O) devices 1560, a central processing unit (CPU) 1552, memory 1556, secondary storage 1554, and a network interface 1562.

The CPU 1552 may comprise any type of electronic data processor. The CPU 1552 may be configured to implement a scheme described herein, such as the process 1400 illustrated in FIG. 14B. The CPU 1552 may be configured to implement select steps in process 900 of FIG. 9. For example, the CPU 1552 may be configured to implement steps 904 and or 908 of process 900. Note that this may involve sending suitable control signals to the buck stages 104 and/or boost stage 106.

The memory 1556 may comprise any type of system memory such as static random access memory (SRAM), dynamic random access memory (DRAM), synchronous DRAM (SDRAM), read-only memory (ROM), a combination thereof, or the like. In an embodiment, the memory 1556 may include ROM for use at boot-up, and DRAM for program and data storage for use while executing programs. In embodiments, the memory 1556 is non-transitory. The secondary storage device 1554 may comprise any type of storage device configured to store data, programs, and other information and to make the data, programs, and other information accessible via the bus. The secondary storage device 1554 may comprise, for example, one or more of a solid state drive, hard disk drive, a magnetic disk drive, an optical disk drive, or the like.

The processing unit 1500 also includes one or more network interfaces 1562, which may comprise wired links, such as an Ethernet cable or the like, and/or wireless links. In one embodiment, the network interface 1562 allows the processing unit 1500 to communicate with the solar inverter 204. The network interface 1562 may provide wireless communication via one or more transmitters/transmit antennas and one or more receivers/receive antennas. In an embodiment, the processing unit 1500 is coupled to a local-area network or a wide-area network for data processing and communications with remote devices, such as other processing units, the Internet, remote storage facilities, or the like.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a plurality of buck stages each having an input configured to receive a DC voltage from a DC power source and a buck stage output configured to provide a DC voltage;
logic configured to operate the plurality of buck stages to regulate a power output of each of the DC power sources, including operate the respective buck stages at target duty cycles to maintain a target power efficiency for each buck stage, the combined DC voltages from the plurality of buck stage outputs depends on the target duty cycles; and
a boost stage comprising a boost stage output and a single boost stage input configured to receive the combined DC voltages from the plurality of buck stage outputs;
wherein the logic is further configured to instruct the boost stage to reduce the DC voltage at the input of the boost stage below a threshold voltage responsive to a determination that the combined DC voltages of the plurality of buck stages will be below the threshold voltage in order to maintain the target duty cycles of the respective buck stages.

2. The system of claim 1, wherein the boost stage further comprises a filter that is configured to receive a current output of the plurality of buck stages.

3. The system of claim 2, wherein the boost stage is configured to use the filter as an energy storage device.

4. The system of claim 3, wherein the filter is an inductor.

5. The system of claim 4, wherein the plurality of buck stages and the boost stage share the inductor.

6. The system of claim 1, wherein the DC voltage sources are photovoltaic modules, wherein the target power efficiency for each buck stage is at the maximum power point of the respective photovoltaic module.

7. The system of claim 1, further comprising:
a DC to AC converter having an input connected to the boost stage output, wherein the DC to AC converter is configured to regulate a DC voltage at the input of the DC to AC converter.

8. The system of claim 7, wherein the logic is further configured to:
control a duty cycle of the boost stage to reduce the voltage at the input of the boost stage relative to the voltage at the output of the boost stage responsive to a determination that the DC voltage at the input of the DC to AC converter does not meet a criterion.

9. The system of claim 1, wherein the plurality of buck stages are configured to generate a pulse width modulated output voltage at the same switching frequency, wherein the plurality of buck stages are configured to interleave the pulse width modulated output voltages.

10. The system of claim 1, wherein the plurality of buck stages are inductorless.

11. A method of operating a power generation system, the method comprising:
receiving DC voltages from each of respective ones of a plurality of photovoltaic modules at a corresponding plurality of buck stages;
operating each of the plurality of buck stages to regulate a power output of the corresponding photovoltaic modules, including generating a DC output voltage for each buck stage, including operating the respective buck stages at target duty cycles to maintain a target power efficiency for each buck stage, the combined DC voltages from the plurality of buck stage outputs depends on the target duty cycles;
receiving a combined DC output voltage from all of the plurality of buck stages at an input of a single boost stage;
operating the single boost stage to boost the combined output voltage from the plurality of buck stages, including instructing the boost stage to reduce the DC voltage at the input of the boost stage below a threshold voltage responsive to a determination that the combined DC voltages of the plurality of buck stages will be below the threshold voltage in order to maintain the target duty cycles of the respective buck stages to thereby allow the respective buck stages to be operated at the target duty cycles; and
providing the boosted voltage to a solar inverter.

12. The method of claim 11, further comprising receiving an output current of the plurality of buck stages at a filter of the boost stage.

13. The method of claim 12, wherein the filter comprises an inductor, wherein operating the boost stage to boost the output voltage from the buck stages comprises storing energy in the inductor.

14. The method of claim 11, further comprising:
boosting the reduced DC voltage at the input of the boost stage to maintain the output voltage of the boost stage at a target voltage level for the solar inverter.

15. The method of claim 11, wherein operating each of the plurality of buck stages to regulate a power output of the corresponding photovoltaic modules comprises:
generating a pulse width modulated output voltage at each of the buck stages at the same switching frequency; and
interleaving the pulse width modulated output voltages.

16. A photovoltaic power system, comprising:
a plurality of photovoltaic modules, each configured to provide a DC voltage;
a buck-boost convertor comprising a plurality of buck stages and a single boost stage, wherein each of the buck stages comprises an input configured to receive the DC voltage from one of the photovoltaic modules, wherein each of the buck stages comprises an output configured to provide a DC voltage, wherein each of the buck stages is configured to regulate a power output of the corresponding photovoltaic module, wherein the single boost stage comprises a single input configured to receive the combined DC voltages from the plurality of buck stage outputs, wherein the single boost stage comprises an output configured to provide a DC voltage; and
logic configured to operate the respective buck stages at target duty cycles to maintain a target power efficiency for each buck stage, the combined DC voltages from the plurality of buck stage outputs depends on the target duty cycles, the logic is further configured to instruct the boost stage to reduce the DC voltage at the input of the boost stage below a threshold voltage responsive to a determination that the combined DC voltages of the plurality of buck stages will be below the threshold voltage in order to maintain the target duty cycles of the respective buck stages.

17. The photovoltaic power system of claim 16, wherein the plurality of buck stages are configured to provide a series output current, wherein the boost stage comprises an inductor that is configured to receive the series current.

18. The photovoltaic power system of claim 17, wherein the boost stage is configured to use the inductor as an energy storage device to boost the combined DC voltages from the plurality of buck stages and to provide the boosted voltage at the output of the boost stage.

19. The photovoltaic power system of claim 16, wherein the photovoltaic power system further comprises a plurality of buck-boost convertors as recited in claim 16, wherein the plurality of buck-boost convertors are connected in series, wherein the combined DC voltage output from the boost stages of the plurality of buck-boost convertors is provided to a solar inverter.

20. The photovoltaic power system of claim 16, wherein the photovoltaic power system further comprises:
 a plurality of buck-boost convertors as recited in claim 16, wherein the plurality of buck-boost convertors are connected in series;
 an additional boost stage having an input configured to receive the combined DC voltages from the boost stages of the plurality of buck-boost convertors; and
 a solar inverter having a DC input configured to receive a DC voltage from an output of the additional boost stage.

21. The photovoltaic power system of claim 16, wherein the plurality of buck stages are configured to generate a pulse width modulated output voltage at the same switching frequency, wherein the plurality of buck stages are configured to interleave the pulse width modulated output voltages.

22. The photovoltaic power system of claim 16, wherein a first of the photovoltaic modules comprises a single photovoltaic panel, multiple photovoltaic panels that are connected in series, or a sub-string of a photovoltaic panel.

23. The photovoltaic power system of claim 16, wherein the photovoltaic power system comprises a plurality of buck-boost convertors as recited in claim 16, wherein the plurality of buck-boost convertors are connected in series, connected in parallel, or a combination of series and parallel.

* * * * *